US008725662B2

(12) United States Patent
Izhikevich et al.

(10) Patent No.: US 8,725,662 B2
(45) Date of Patent: May 13, 2014

(54) APPARATUS AND METHOD FOR PARTIAL EVALUATION OF SYNAPTIC UPDATES BASED ON SYSTEM EVENTS

(75) Inventors: Eugene M. Izhikevich, San Diego, CA (US); Filip Piekniewski, San Diego, CA (US); Jayram Moorkanikara Nageswaran, San Diego, CA (US)

(73) Assignee: Brain Corporation, San Diego, CA (US)

( * ) Notice: Subject to any disclaimer, the term of this patent is extended or adjusted under 35 U.S.C. 154(b) by 294 days.

(21) Appl. No.: 13/239,259

(22) Filed: Sep. 21, 2011

(65) Prior Publication Data

US 2013/0073499 A1    Mar. 21, 2013

(51) Int. Cl.
*G06N 3/08* (2006.01)
(52) U.S. Cl.
USPC .......................................................... 706/12
(58) Field of Classification Search
CPC ........................................................ G06N 3/08
USPC .......................................................... 706/27
See application file for complete search history.

(56) References Cited

U.S. PATENT DOCUMENTS

| 2005/0015351 | A1 |  | 1/2005 | Nugent |  |
|---|---|---|---|---|---|
| 2007/0176643 | A1 |  | 8/2007 | Nugent |  |
| 2011/0016071 | A1 |  | 1/2011 | Guillen et al. |  |
| 2012/0011090 | A1 | * | 1/2012 | Tang et al. | 706/33 |
| 2012/0109866 | A1 | * | 5/2012 | Modha | 706/28 |
| 2012/0308076 | A1 |  | 12/2012 | Piekniewski et al. |  |
| 2012/0308136 | A1 |  | 12/2012 | Izhikevich |  |

FOREIGN PATENT DOCUMENTS

WO    2008083335 A2    7/2008

OTHER PUBLICATIONS

Eugene M. Izhikevich, Simple Model of Spiking Neurons, IEEE Transactions on Neural Networks, vol. 14, No. 6, Nov. 2003, pp. 1569-1572.*
Jan Karbowski and Nancy Kopell, Multispikes and Synchronization in a Large Neural Network with Temporal Delays, Neural Computation 12, 1573-1606 (2000).*
"Specification and figures of U.S. Appl. No. 13/152,119, filed Jun. 2, 2011 and entitled "Sensory Input Processing Apparatus and Methods" (pp. 1-45)."
Jin, X., Rest, A., F. Galluppi, F., S. Davies., S., and Furber, S. (2010) "Implementing Spike-Timing-Dependent Plasticity on SpiNNaker Neuromorphic Hardware", WCCI 2010, *IEEE World Congress on Computational Intelligence*.

(Continued)

*Primary Examiner* — Jeffrey A Gaffin
*Assistant Examiner* — Ola Olude Afolabi
(74) *Attorney, Agent, or Firm* — Gazdzinski & Associates, PC

(57) ABSTRACT

Apparatus and methods for partial evaluation of synaptic updates in neural networks. In one embodiment, a pre-synaptic unit is connected to a several post synaptic units via communication channels. Information related to a plurality of post-synaptic pulses generated by the post-synaptic units is stored by the network in response to a system event. Synaptic channel updates are performed by the network using the time intervals between a pre-synaptic pulse, which is being generated prior to the system event, and at least a portion of the plurality of the post synaptic pulses. The system event enables removal of the information related to the portion of the post-synaptic pulses from the storage device. A shared memory block within the storage device is used to store data related to post-synaptic pulses generated by different post-synaptic nodes. This configuration enables memory use optimization of post-synaptic units with different firing rates.

27 Claims, 27 Drawing Sheets

(56) References Cited

OTHER PUBLICATIONS

Izhikevich and Desai 2003, entitled "Relating STDP to BCM", *Neural Computation* 15, 1611-1523.

Abbott L. F. and Nelson S.B. (2000), "Synaptic plasticity: taming the beast", *Nature Neuroscience*, 3, 1178-1183.

Izhikevich, E. (2003), entitled "Simple Model of Spiking Neurons", *IEEE Transactions on Neural Networks*, 14, 1569-1572.

\* cited by examiner

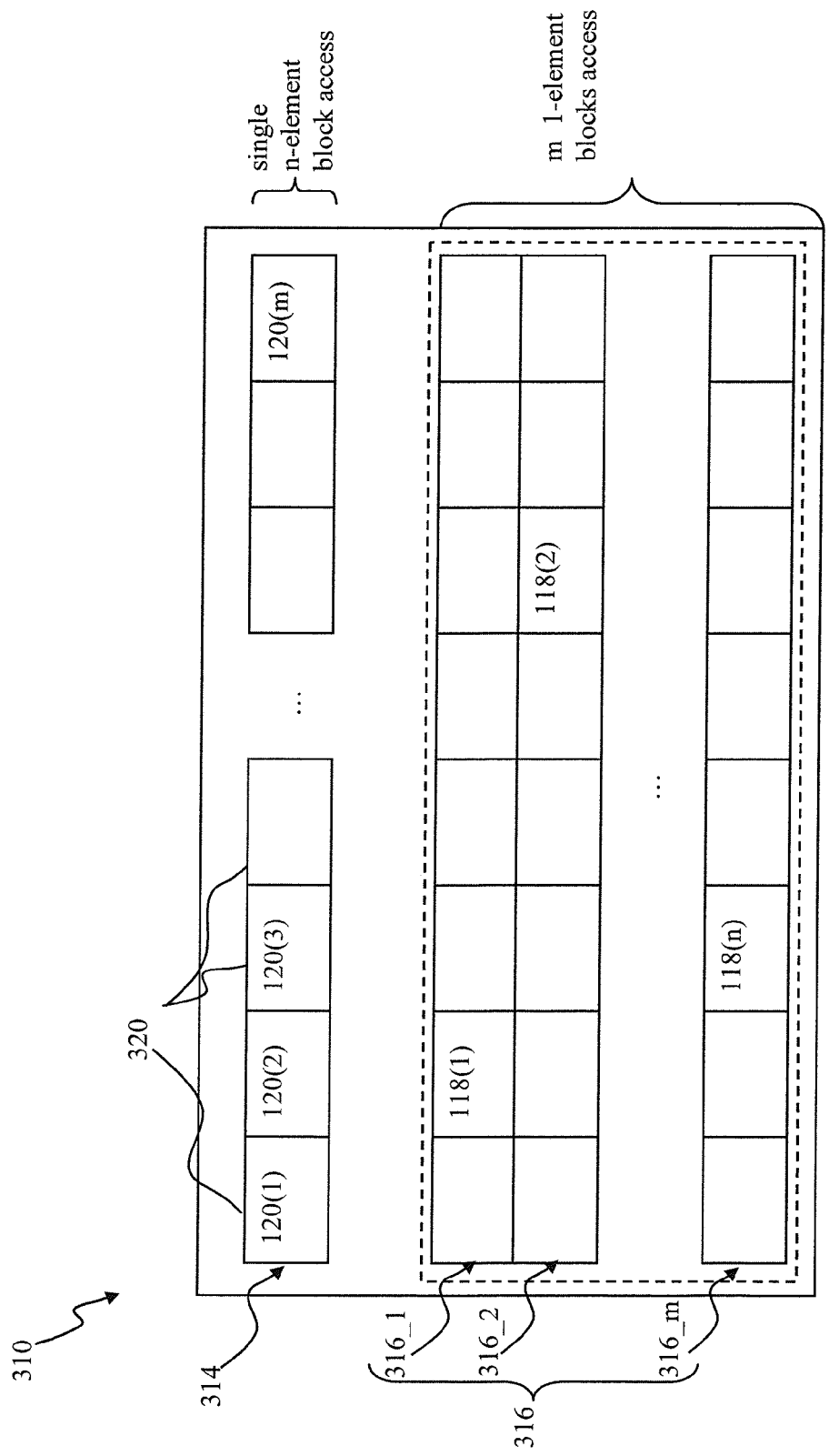

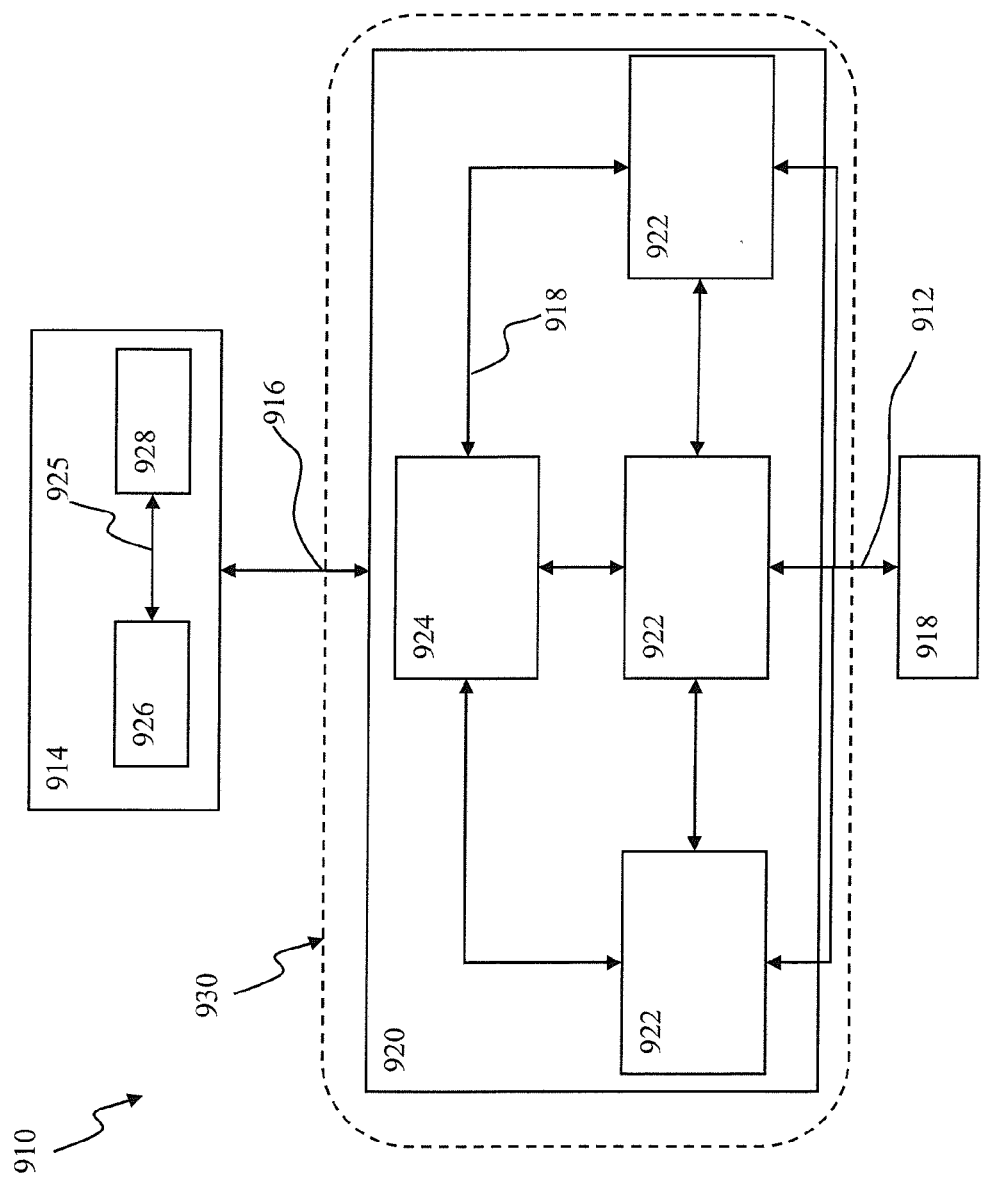

APPARATUS AND METHOD FOR PARTIAL EVALUATION OF SYNAPTIC UPDATES BASED ON SYSTEM EVENTS

CROSS-REFERENCE TO RELATED APPLICATIONS

This application is related to co-owned U.S. patent application Ser. No. 13/239,255 filed contemporaneously herewith and entitled "APPARATUS AND METHODS FOR SYNAPTIC UPDATE IN A PULSE-CODED NETWORK", U.S. patent application Ser. No. 13/239,123 filed contemporaneously herewith on Sep. 21, 2011 entitled "ELEMENTARY NETWORK DESCRIPTION FOR NEUROMORPHIC SYSTEMS", U.S. patent application Ser. No. 13/239,148 filed contemporaneously herewith on Sep. 21, 2011 entitled "ELEMENTARY NETWORK DESCRIPTION FOR EFFICIENT LINK BETWEEN NEURONAL MODELS AND NEUROMORPHIC SYSTEMS", U.S. patent application Ser. No. 13/239,155 filed contemporaneously herewith on Sep. 21, 2011 entitled "ELEMENTARY NETWORK DESCRIPTION FOR EFFICIENT MEMORY MANAGEMENT IN NEUROMORPHIC SYSTEMS", U.S. patent application Ser. No. 13/239,163 filed contemporaneously herewith on Sep. 21, 2011 entitled "ELEMENTARY NETWORK DESCRIPTION FOR EFFICIENT IMPLEMENTATION OF EVENT-TRIGGERED PLASTICITY RULES IN NEUROMORPHIC SYSTEMS", each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present innovation relates generally to artificial neural networks, and more particularly in one exemplary aspect to computer apparatus and methods for efficient operation of spiking neural networks.

2. Description of Related Art

Artificial spiking neural networks are frequently used to gain an understanding of biological neural networks, and for solving artificial intelligence problems. These networks typically employ a pulse-coded mechanism, which relies on encoding information using timing of the pulses. Such pulses (also referred to as "spikes" or 'impulses') are short-lasting (typically on the order of 1-2 ms) discrete temporal events and are used, inter cilia, to encode information. Several exemplary embodiments of such encoding are described in a commonly owned and co-pending U.S. patent application Ser. No. 13/152,084 entitled APPARATUS AND METHODS FOR PULSE-CODE INVARIANT OBJECT RECOGNITION", and U.S. patent application No. 13/152,119 entitled "SENSORY INPUT PROCESSING APPARATUS AND METHODS", each incorporated herein by reference in its entirety.

A typical artificial spiking neural network includes a plurality of units (or nodes), which correspond to neurons in a biological neural network. A single unit may be connected to many other units via connections, also referred to as communications channels, or synaptic connections. Those units providing inputs to any given unit are commonly referred to as the pre-synaptic units, while the units receiving the inputs from the synaptic connections are referred to as the post-synaptic units.

Each of the unit-to-unit connections is assigned, inter alia, a connection strength (also referred to as the synaptic weight). During operation of the pulse-coded network, synaptic weights are dynamically adjusted using what is referred to as the spike-timing dependent plasticity (STDP) in order to implement, among other things, network learning. Typically, each unit may receive inputs from a large number (up to 10,000) of pre-synaptic units having associated pre-synaptic weights, and provides outputs to a similar number of downstream units via post-synaptic connections (having associated post-synaptic weights). Such network topography therefore comprises several millions of connections (channels), hence requiring access, modification, and storing of a large number of synaptic variables for each unit in order to process each of the incoming and outgoing pulse through the unit.

Various techniques for accessing the synaptic variables from the synaptic memory exist. The synaptic weights are typically stored in the synaptic memory using two approaches: (i) post-synaptically indexed: that is, based on the identification (ID) of the destination unit, e.g., the post-synaptic unit; and (ii) pre-synaptically indexed: that is based on the source unit ID, e.g., the pre-synaptic unit.

When the synaptic data are stored according to the pre-synaptic index, then access based on the post-synaptic index is inefficient. That is, a unit receiving input from m pre-synaptic units and providing n outputs via n post-synaptic channels, requires n reads and n writes of a one-weight block (scattered access) to process the pre-synaptic inputs, and one read, one write of a m-weight block to process the post-synaptic outputs. Similarly, the post-synaptic index based storage scheme results in one read, one write of an m-weight block to process the pre-synaptic inputs, and n reads and n writes of a one-weight block to process the post-synaptic outputs, because one or the other lookup would require a scattered traverse of non-contiguous areas of synaptic memory.

One approach to implement efficient memory access of both pre-synaptic and post-synaptic weights is proposed by Jin et al. and is referred to as the "pre-synaptic sensitive scheme with an associated deferred event-driven model". In the model of Jin, synaptic variable modification is triggered during a pre-synaptic spike event (no synaptic variables access during post-synaptic spike event), and hence the synaptic information is stored based only on the pre-synaptic index (see Jin, X., Rast, A., F. Galluppi, F., S. Davies., S., and Furber, S. (2010) "Implementing Spike-Timing-Dependent Plasticity on SpiNNaker Neuromorphic Hardware", WCCI 2010, IEEE World Congress on Computational Intelligence), incorporated herein by reference in its entirety. In addition, the actual update of synaptic variables is deferred until a certain time window expires.

However, this approach has several limitations. For a typical STDP window of 100 ms, the corresponding firing rate of the pre-synaptic neuron needs to be greater than 10 Hz for the scheme of Jin et al. (2010) to work properly. Furthermore, the deferred approach of Jin et al. (2010) does not provide immediate update for the synaptic weights, because the approach waits for the time window to expire before modifying the synaptic weight, thereby adversely affecting the accuracy of post-synaptic pulse generation by the unit.

Existing synaptic update approaches do not provide synaptic memory access mechanisms that are efficient for a large category of spiking neural networks. Such approaches also do not provide up-to-date synaptic variables for different kind of learning rules, and are limited by the firing rate of the pre-synaptic and post-synaptic units.

Furthermore, existing synaptic weight update schemes are not applicable to different plasticity models, such as the nearest-neighbor, all-to-all etc. See Izhikevich and Desai 2003, entitled "Relating STDP to BCM", *Neural Computation* 15, 1511-1523, incorporated herein by reference in its entirety, relating to various plasticity rules such as STDP, inverse STDP, and "bump" STDP. See also Abbott L. F. and Nelson S. B. (2000), "Synaptic plasticity: taming the beast", *Nature Neuroscience*, 3, 1178-1183, also incorporated herein by reference in its entirety.

Accordingly, there is a salient need for a more efficient, timely, and scalable synaptic variable update mechanism that is applicable to many different types of plasticity models and different plasticity rules.

SUMMARY OF THE INVENTION

In a first aspect of the invention, a computerized spiking network apparatus is disclosed. In one embodiment, the apparatus includes: a storage apparatus; and a pre-synaptic unit in communication with a post-synaptic unit by a communication channel. In one variant, the apparatus is configured to operate by: storing information related to a plurality of pulses in the storage apparatus, the plurality of output pulses being generated by the post-synaptic unit at a plurality of generation times between a triggering pulse and a system event; and evaluating a plurality of updates based on a plurality of intervals between the triggering pulse and each of the plurality of generation times. The system event enables removal of at least a portion of the information related to the plurality of pulses from the storage apparatus.

In another variant, the triggering pulse is generated by the pre-synaptic unit, and is communicated through the channel.

In a second aspect of the invention, a method of operating a communications channel coupled to a post-synaptic unit in a computerized spiking neuronal network is disclosed. In one embodiment, the method includes: modifying the channel based on a first group of pulses associated with the post-synaptic unit, the first group of pulses occurring between a preceding trigger communicated via the channel and a system event; and maintaining the channel substantially unmodified between the system event and the preceding trigger.

In one variant, the method further includes storing, in a shared memory block of a storage apparatus, information related to the first group of pulses a second group of pulses, the second group of pulses being associated with one other post-synaptic unit. The system event is generated by a network entity in data communication with the post-synaptic unit and is based at least in part on a portion of the information being stored in the shared memory block, the portion being related to at least one pulse of the first group of pulses.

In another variant, the method further includes storing information related to the first group of pulses in a shift register.

In a third aspect of the invention, a method of operating a node of a spiking network is disclosed. In one embodiment, the method includes: responsive to a system event, storing in a storage device a plurality of intervals between a first trigger and a plurality of pulses generated by the node. The first trigger is communicated to the node via a channel prior to the system event.

In one variant, each of the plurality of pulses is being generated prior to the system event; and the plurality of intervals is configured based on information related to the plurality of pulses.

In another variant, the method further includes performing a first update of the channel based at least in part on the plurality of intervals.

In yet another variant, the method further includes: performing a first update of the channel based on a first interval of the plurality of intervals; and subsequent to performing the first update, performing a second update of the channel based on a second interval between a second trigger and a latest pulse of the plurality of pulses generated by the node. The first update and the second update cooperate to determine an updated channel weight; and the second trigger is communicated via the channel subsequent to the system event.

In a fourth aspect of the invention, a method of optimizing operation of a shared storage of computerized network apparatus is disclosed. In one embodiment, the apparatus includes at least one node coupled to a channel, and the method includes: storing, in the shared storage, information related to a plurality of pulses associated with the at least one node; and updating the channel in response to a system event by at least a plurality of updates based on a plurality of intervals between a trigger being communicated through the channel, and the plurality of pulses. The updating of the channel enables removal of at least a portion of the information from the shared storage.

In one variant, the method further includes storing, in the shared storage, information related to a group of pulses associated with one other node; wherein: the at least one node is characterized by a first output pulse rate; the one other node is characterized by a second output pulse rate, and the second output pulse rate is lower than the first output pulse rate. In another variant, the shared storage includes: a first memory portion configured to stored data related to the plurality of pulses associated with the at least one node; and at least a second memory portion configured to stored data related to the group of pulses associated with the one other node. The second portion is smaller than the first portion.

In yet another aspect of the invention, a computerized neuronal system is disclosed. In one embodiment, the system includes a spiking neuronal network, and an apparatus controlled at least in part by the neuronal network.

In a further aspect of the invention, a shared architecture is disclosed.

In still a further aspect of the invention, a computer readable apparatus is disclosed. In one embodiment, the apparatus includes a storage medium having at least one computer program stored thereon, the at least one program being configured to, when executed, implement shared storage architecture operation.

BRIEF DESCRIPTION OF THE DRAWINGS

FIG. 3A is a block diagram illustrating one embodiment of a synaptic memory architecture for use with the network apparatus of FIG. 3.

FIG. 9A is a block diagram illustrating a first embodiment of computerized neuro-synaptic execution apparatus for implementing the multi-partition network of FIG. 9.

Figure 1A:
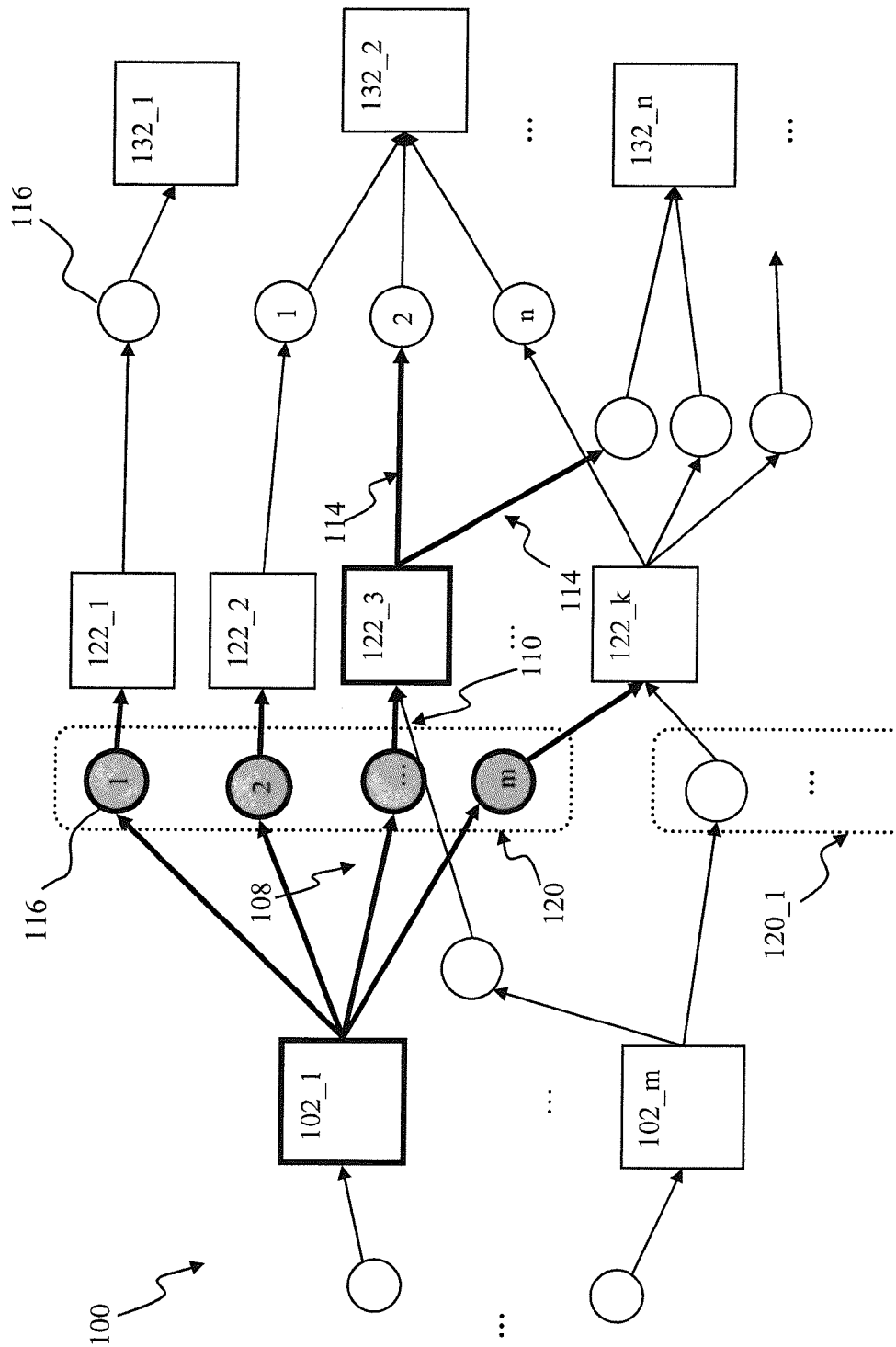
FIG. 1A is a block diagram illustrating one embodiment of pre-synaptic indexing in an artificial spiking neural network.

All Figures disclosed herein are © Copyright 2011 Brain Corporation. All rights reserved.

DETAILED DESCRIPTION OF THE EXEMPLARY EMBODIMENTS

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of or combination with some or all of the described or illustrated elements. Wherever convenient, the same reference numbers will be used throughout the drawings to refer to same or like parts.

Where certain elements of these embodiments can be partially or fully implemented using known components, only those portions of such known components that are necessary for an understanding of the present invention will be described, and detailed descriptions of other portions of such known components will be omitted so as not to obscure the invention.

In the present specification, an embodiment showing a singular component should not be considered limiting; rather, the invention is intended to encompass other embodiments including a plurality of the same component, and vice-versa, unless explicitly stated otherwise herein.

Further, the present invention encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in pulse-based system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), Java Bytecode, Low-level Virtual Machine (LLVM), and the like.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, stream processors (e.g., GPU), secure microprocessors, and application-specific integrated circuits (ASICs). Such digital processors may be contained on a single unitary IC die, or distributed across multiple components.

As used herein, the terms as "pulse", "spike", "burst of spikes", and "pulse train" are meant generally to refer to, without limitation, any type of a pulsed signal, e.g., a rapid change in some characteristic of a signal such as amplitude, intensity, phase or frequency, from a baseline value to a higher or lower value, followed by a rapid return to the baseline or other value, and may refer to any of a single spike, a burst of spikes, an electronic pulse, a pulse in voltage, a pulse in electrical current, a software representation of a pulse and/or burst of pulses, a software representation of a latency or timing of the pulse, and any other pulse or pulse type associated with a pulsed transmission system or mechanism.

As used herein, the term "pulse-code" is meant generally to denote, without limitation, information encoding into a patterns of pulses (or pulse latencies) along a single pulsed channel or relative pulse latencies along multiple channels.

As used herein, the terms "pulse delivery", "spike delivery", and "pulse application" is meant generally to denote, without limitation, transfer of connection information related to the connection (e.g., synaptic channel) to a destination unit in response to a pulse from a sending unit via the connection.

As used herein, the terms "receiving pulse" and "arrival of the pulse" are meant generally to denote, without limitation, a receipt of a physical signal (either voltage, lights, or current) or a logical trigger (memory value) indicating a trigger event associated with the transmission of information from one entity to another.

As used herein, the term "synaptic channel", "connection", "link", "transmission channel", "delay line", and "communications channel" are meant generally to denote, without limitation, a link between any two or more entities (whether physical (wired or wireless), or logical/virtual) which enables information exchange between the entities, and is characterized by a one or more variables affecting the information exchange.

As used herein, the term "spike-timing dependent plasticity" or STDP is meant generally to denote, without limitation, an activity-dependent learning rule where the precise timing of inputs and output activity (spikes) determines the rate of change of connection weights.

Overview

The present invention provides, in one salient aspect, apparatus and methods for efficient memory access during synaptic variable updates in a spiking neural network for implementing synaptic plasticity and learning.

In one embodiment, a computerized network apparatus is disclosed which includes multiple pre-synaptic units (or nodes) connected to post-synaptic units (or nodes) via communications links (synaptic connections), and a storage device configured to store information related to the connections. In order to implement synaptic plasticity and learning, one or more parameters associated with the synaptic connections are updated based on (i) a pre-synaptic pulse generated by the pre-synaptic node and received by the post-synaptic node (a pre-synaptic update), and (ii) a post synaptic pulse generated by the post-synaptic node subsequent to the pre-synaptic pulse (a post-synaptic update). In one embodiment, the post-synaptic updates are delayed until receipt of the next subsequent pre-synaptic pulse by the post-synaptic node. The pre-synaptic update is performed first, followed by the post-synaptic update, thus ensuring that synaptic connection status is up-to-date.

In another embodiment, the connection updates are only preformed whenever a pre-synaptic pulse is received, while leaving the connection state unchanged in between adjacent pre-synaptic pulses.

The delay update mechanism is used in conjunction with system "flush" events (i.e., events which are configured to cause removal (flushing) of a portion of the data related to some of the post-synaptic pulses) in order to ensure network accurate operation, and prevent loss of information under a variety of pre-synaptic and post-synaptic unit firing rates. A large network partition mechanism is used in one embodiment with network processing apparatus in order to enable processing of network signals in a limited functionality embedded hardware environment.

The use of delayed connection updates advantageously reduces memory access fragmentation and improves memory bandwidth utilization. These improvements may be traded for processing of additional pulses (increased pulse rate), additional nodes (higher network density), or use of simpler and less costly computerized hardware for operating the network.

Detailed Description of Exemplary Embodiments

Detailed descriptions of the various embodiments and variants of the apparatus and methods of the invention are now provided. Embodiments of the invention may be, for example, deployed in a hardware and/or software implementation of a computer-vision system, provided in one or more of a prosthetic device, robotic device and a specialized visual system. In one such implementation, an image processing system may include a processor embodied in an application specific integrated circuit ("ASIC"), a central processing unit (CPU), a graphics processing unit (GPU), a digital signal processor (DSP) or an application specific processor (ASIP) or other general purpose multiprocessor, which can be adapted or configured for use in an embedded application such as a prosthetic device.

Exemplary Network Architecture

A typical pulse-coded artificial spiking neural network (such as the network 100 shown in FIG. 1A) comprises a plurality of units 102, 122, 132 which correspond to neurons in a biological neural network. A single unit 102 may be connected to many other units via connections 108, 114 (also referred to as communications channels, or synaptic connections).

Each synaptic connection is characterized by one or more synaptic variables, comprising one or more synaptic (channel) weight, channel delay, and post-synaptic unit identification, i.e. target unit ID. The synaptic weight describes the strength or amplitude of the connection between two units (affecting, inter alia, amplitude of pulses transmitted by that connection), corresponding in biology to the amount of influence the firing of one neuron has on another neuron. The synaptic variables (also referred to as the synaptic nodes), denoted by circles 116 in FIG. 1A, are analogous to synapses of a nervous system that allow passage of information from one neuron to another.

The network 100 shown in FIG. 1A is implemented using a feed-forward architecture, where information propagates through the network from the left-most units (e.g., 102) to the right-most units (e.g., 132), as indicated by the connection arrows 108, 114. In one variant (not shown), separate feedback channels may be used to implement feedback mechanisms, such as for example those described in commonly owned and co-pending U.S. patent application Ser. No. 13/152,105 entitled "APPARATUS AND METHODS FOR PULSE-CODE TEMPORALLY PROXIMATE OBJECT RECOGNITION", incorporated by reference herein in its entirety. In another variant, the network comprises a recurrent network architecture which implements a feedback mechanism provided by a certain set of units within the network. In this class of recurrent network architecture, connections not only exits to higher layers, but to units within the current layer. As will be appreciated by those skilled in the arts, the exemplary synaptic update mechanism described herein is applicable to literally any type of pulse-coded spiking neural network.

Units providing inputs to any given unit (such as the unit 122_3 in FIG. 1A) are referred to as the pre-synaptic or upstream units (e.g., units 102_1, 102_$m$ located to the left from the unit 122), while the units (e.g., units 132_1, 132_2, 132_3 located to the right from the unit 122) that receive outputs from the unit 122_1, are referred to as the post-synaptic or downstream units. The banks of units 102 {102_1, . . . 102_$m$}, 122 {122_1, . . . 122_$k$}, 132 {132_1, 132_$n$} form a successive cascade of units, such that any given unit within one cascade (e.g., the unit 122_3) comprises the post-synaptic unit for a unit from the preceding cascade (e.g., the unit 102_1), while, at the same time, the aforementioned unit 122_3 comprises a pre-synaptic unit for the unit 132_3 of the subsequent cascade.

Similarly, connections that deliver inputs to a unit are referred to as the input channel (or pre-synaptic) connections for that unit (e.g., the channels 108 for the unit 122_3), while connections that deliver outputs from the unit (such as the channels 114) are referred to as output channel (or post-synaptic) connections for that unit 122_3. As seen from FIG. 1A, the same connection (for example channel 114) acts as the output (post-synaptic) connection for the unit 122_3 and as the input connection for the unit 132_2.

Any given unit (such as for example the unit 122_3) may receives inputs from a number m of pre-synaptic units, and it provides outputs to a number n of downstream units. During operation of the spiking neural network 100, whenever a unit (for example the unit 122_3) processes a synaptic event (e.g., generates an output pulse), synaptic variables of the pre-synaptic and post-synaptic connections are dynamically adjusted based, inter alia, on the timing difference between input and output pulses processed by the unit 122_3 using a variety of mechanisms described below.

Typically, a given network topography 100 comprises several millions or billions of connections, each characterized by a synaptic variable (e.g., weight). As a result, such pulse-coded network requires access, modification, and storing of a large number of synaptic variables (typically many millions to billions for n, m~1000) in order to implement learning mechanisms when processing the incoming and outgoing signals at each unit of the network 100.

Figure 1B:
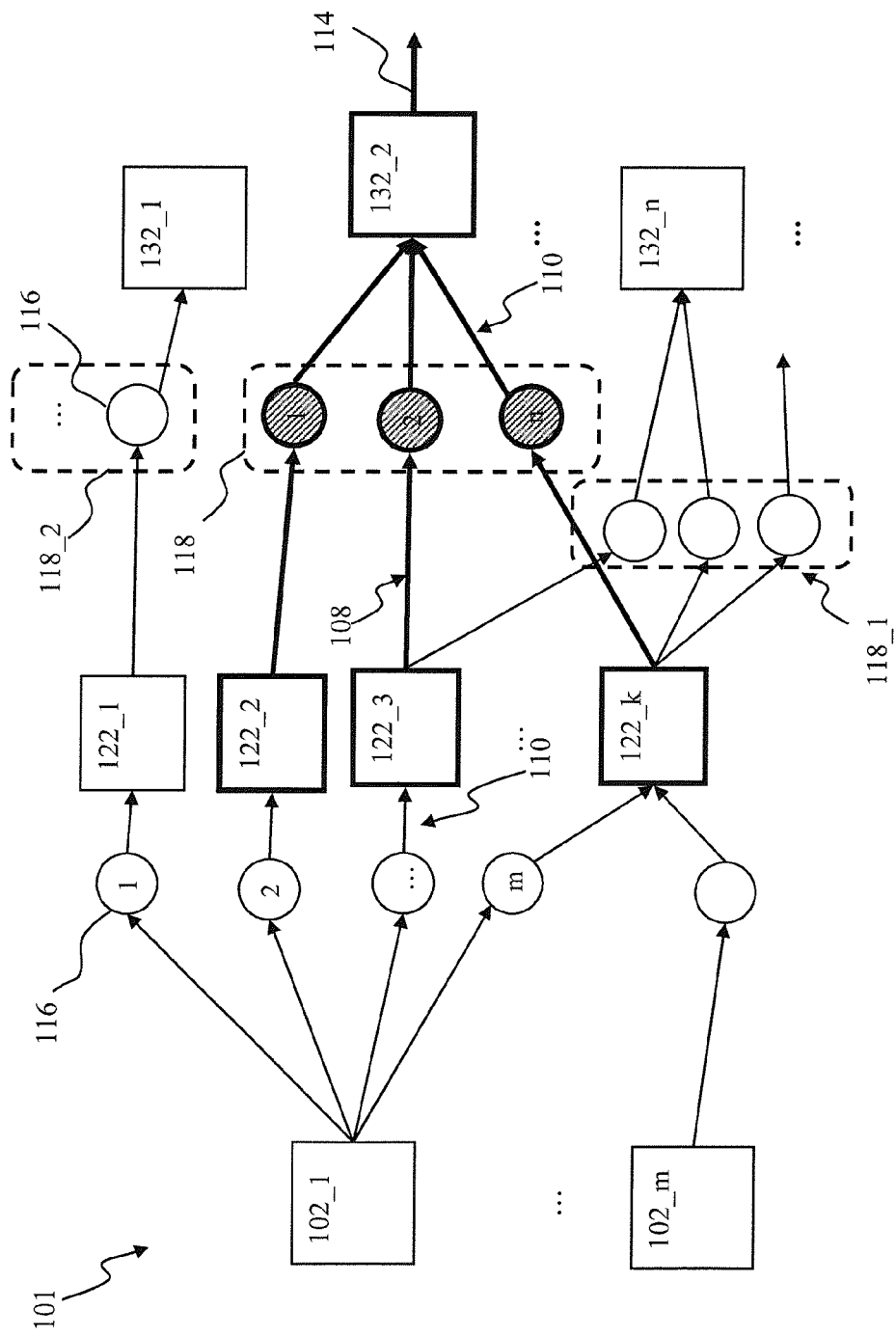
FIG. 1B is a block diagram illustrating one embodiment of post-synaptic indexing in artificial spiking neural network.

The synaptic variables of a spiking network may be stored and addressed in using a pre-synaptic indexing (as illustrated by the network embodiment of FIG. 1A), or post-synaptically indexed, as illustrated by the network embodiment of FIG. 1B discussed infra. In a pre-synaptically indexed network of FIG. 1A, synaptic variables (denoted by gray circles in FIG. 1A) corresponding to synaptic connections that deliver outputs from the same pre-synaptic unit (such as the unit 102_1 in FIG. 1A) are stored in a single pre-synaptically indexed memory block (that is based, for example, on the sending unit ID) as denoted by a dotted-line rectangles 120 in FIG. 1A.

In a post-synaptically indexed network 101 such as that of FIG. 1B, synaptic variables corresponding to the synaptic connections providing inputs into a given unit (such as the unit 132_3 in FIG. 1B) are stored in a single post-synaptically indexed memory block (that is based, for example, on the target unit ID), as denoted by dashed-line rectangles 118 in FIG. 1B.

As described above, the synaptic nodes, denoted by circles 116 in FIG. 1A, are analogous to synapses of a true biological nervous system. In one embodiment, the synaptic node is configured as a separate logical entity of the network as illustrated by the configuration 160 in FIG. 1C. In this embodiment, the synaptic node 116 is coupled between the pre-synaptic unit 102 (via the pre-synaptic channel 108) and the post-synaptic unit 122 (via the pulse delivery pathway 110). The network configuration 160 of FIG. 1C closely resembles neuron interconnection structure of vertebrate nervous system.

Figure 1C:
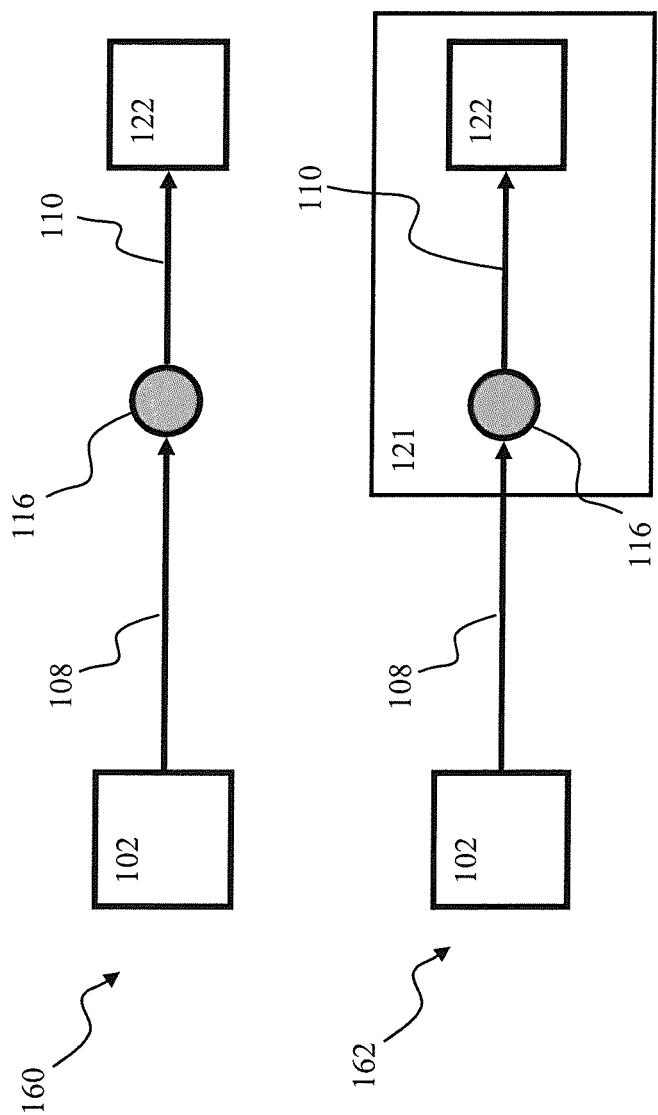
FIG. 1C is a block diagram illustrating different embodiments of network units useful within the artificial spiking neural network of FIGS. 1A-1B.

In another embodiment, the node entity 121 comprises the synaptic node 116 and the post-synaptic unit 122, as illustrated by the configuration 162 in FIG. 1C. In one variant, useful particularly in computerized spiking networks, the synaptic node comprises a memory location (e.g., register, or memory cell, etc).

Figure 1D:
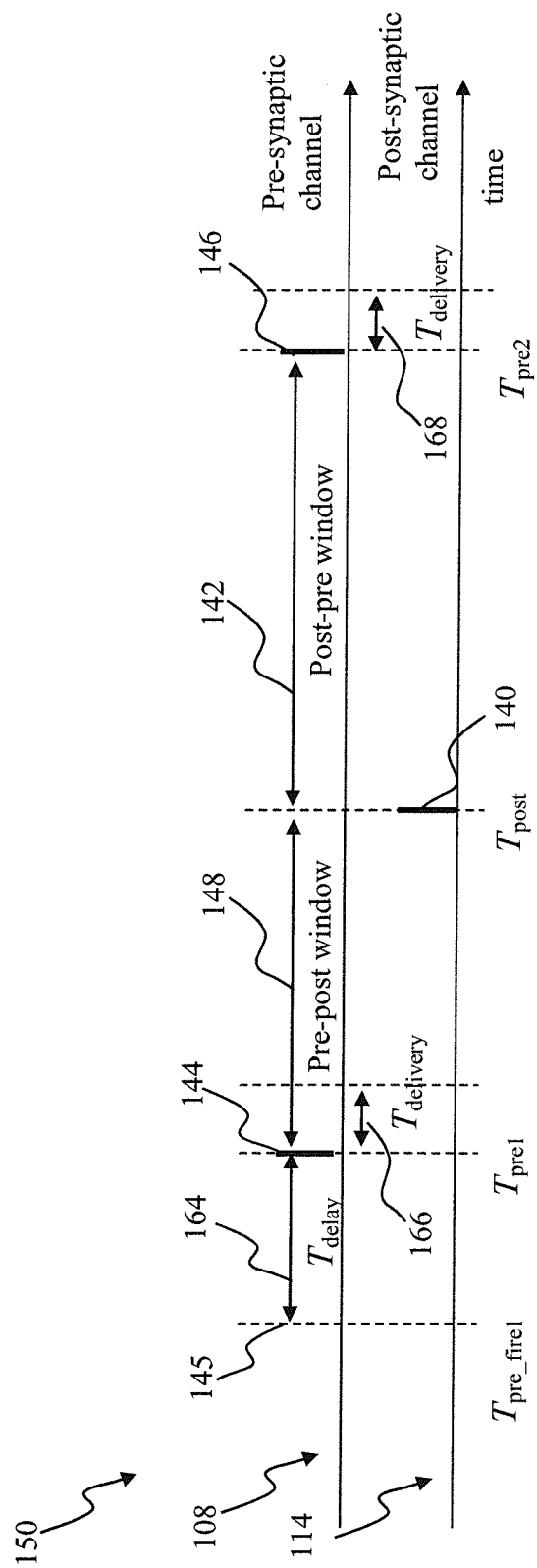
FIG. 1D is a graphical illustration illustrating one embodiment of a generalized synaptic update mechanism useful with the network of FIGS. 1A-1B.

Various concepts associated with spike propagation from a pre-synaptic unit to a post-synaptic unit are described with respect to FIG. 1D herein. When a pre-synaptic unit (e.g., the unit 102 in FIG. 1C) generates (fires) a pulse at time $T_{pre\_fire}$ 145, the generated pulse 144 reaches the synaptic node 116 (or the node entity 121) at time $T_{pre1}$ after a finite propagation delay ($T_{delay}$) 164. In one variant, the delay 164 comprises a conduction delay associated with the communication channel 108. In another variant, the delay 164 is a value assigned to the communication link 108 for, inter alia, controlling pulse synchronicity, as described for example in commonly owned and co-pending U.S. patent application Ser. No. 13/152,084 entitled "APPARATUS AND METHODS FOR PULSE-CODE INVARIANT OBJECT RECOGNITION", and incorporated by reference, supra.

The pulse arriving at the synaptic node 116 (or the entity 122) at the time 144 is referred to as the pre-synaptic pulse. After the pre-synaptic pulse reaches the synaptic node 116, the synaptic variables associated with the synaptic node 116 are loaded (delivered) to the post-synaptic unit 122 at time $T_{pre1}+T_{delivery}$. In one variant, the delivery is instantaneous ($T_{delivery}=0$). The post-synaptic unit 122 operates according to a node dynamical model, such as for example that described in U.S. patent application Ser. No. 13/152,105 entitled "APPARATUS AND METHODS FOR PULSE-CODE TEMPORALLY PROXIMATE OBJECT RECOGNITION" incorporated supra. Upon receiving the pre-synaptic pulse 144, the unit 121 may generate (subject to the node model state) a post-synaptic pulse 140 at time $T_{post}$. In one variant, the post-synaptic pulse generation time $T_{post}$ (also referred to as the post-synaptic unit pulse history) is stored internally (in the unit 121) as a unit variable. In another embodiment, the post-synaptic unit pulse history is stored in a dedicated memory array external to the unit.

Similarly, at time $T_{pre2}$ the unit 122 receives another input, the pre-synaptic pulse 146, that is processed in a manner that is similar to the delivery of the pre-synaptic pulse 144, described supra. The arrival times $T_{pre1}$, $T_{pre2}$ of the pre-synaptic pulses 144, 146, respectively, and the generation time $T_{post}$ of the post-synaptic pulse 140 are used in updating (adjusting) synaptic variables or state of node 116 using any one or more of a variety of spike plasticity mechanisms. An embodiment of one such mechanism, useful for modeling learning in a pulse coded network 100, is shown and described with respect to FIG. 1D herein. The Spike Timing Dependent Plasticity (STDP) method 150 uses pulse timing information in order to adjust the synaptic variables (e.g., weights) of the unit to unit connections. The STDP method of FIG. 1D is described for a single synaptic connection 108 (characterized, for example, by the synaptic weight 116 of FIG. 1A), between the pre-synaptic unit 102_1 and post-synaptic unit 122_3 of FIG. 1A. A similar mechanism is applied on every other connection shown in FIG. 1A based on the timing of the firing between respective post-synaptic units (e.g., unit 121) and the pre-synaptic units (e.g. unit 102). The STDP adjustment of FIG. 1D is performed in one embodiment as follows: (i) when the pre-synaptic pulse 144 is received by the unit 122_3, the time of arrival $T_{pre1}$ is stored; and (ii) when the unit subsequently generates the post-synaptic pulse 140, the pre-post window (corresponding to the time interval 148 between $T_{post}$ and $T_{pre1}$) is computed. In the embodiment of FIG. 1D, the pre-post window 148 is negative, as $\Delta t = T_{pre1} - T_{post}$ and $T_{post} > T_{pre1}$. The post-synaptic pulse 140 is output to downstream units 132 via the post synaptic channels 114 having the associated post-synaptic variables (such as the variables of the channel group 118 in FIG. 1B.

When the unit subsequently receives another pre-synaptic pulse 146 (generated by the same unit 102_1), the post-pre window, corresponding to the time interval 142 between $T_{post}$ and $T_{pre2}$ is computed. In the embodiment of FIG. 1D the post-pre window 142 is positive, as $\Delta t = T_{pre2} - T_{post}$, and $T_{pre2} \geq T_{post}$. Correspondingly, the plasticity rule that is used after the receipt of a pre-synaptic pulse (e.g., the pulse 146) is referred to as the post-pre synaptic STDP rule (or as the "post-pre rule"), and it uses the post-pre window 142. The plasticity rule that is used after the generation of the post-synaptic pulse 140, using the time interval 148, and it is referred to as the pre-post synaptic STDP rule (or as "pre-post rule").

In one variant, the pre-post rule potentiates synaptic connections when the pre-synaptic pulse (such as the pulse 144) is received by the post-synaptic unit before the pulse 140 is fired. Conversely, post-pre STDP rule depresses synaptic connections when the pre-synaptic pulse (such as the pulse 146) is received by to the post-synaptic unit after the pulse 140 is generated. Such rules are typically referred to as the long-term potentiation (LTP) rule and long-term depression (LTD) rule, respectively. Various potentiating and depression implementations exist, such as for example, an exponential rule defined as:

$$w(\Delta t) = A_1 \exp\left(\frac{\Delta t}{t1}\right), \Delta t < 0, \quad \text{(Eqn. 1)}$$

$$w(\Delta t) = -A_2 \exp\left(-\frac{\Delta t}{t2}\right), \Delta t \geq 0, \quad \text{(Eqn. 2)}$$

where:

$A_1$, $A_2$ are the maximum adjustment amplitudes of the pre-synaptic and post-synaptic modifications, respectively;

$t_1$, $t_2$ are the time-windows for the pre-synaptic and post-synaptic modifications, respectively;

$\Delta t = T_{pre} - T_{post}$; and $T_{pre}$, $T_{post}$ are the pre-synaptic and the post-synaptic pulse time stamps, respectively.

As a result, in a typical realization of the STDP rule, the following steps are performed a network unit (for example, the unit 122_3 in FIG. 1A) for adjusting the synaptic variables—such as the variables of the pre-synaptic connection group 120 in FIG. 1A—in order to effect learning mechanisms of the spiking neural network 100:

Pre-synaptic Pulse Rule: For every pre-synaptic pulse received by a group of post-synaptic units (pulse from 102_1 received by 122_1, 122_3, 122_k in FIG. 1A), the synaptic variables corresponding to the synaptic connections (the connection group 120 in FIG. 1A) are updated based on post-pre rule. After updating the synaptic variables, the updated synaptic variables (e.g., synaptic weights) are applied (delivered) to the respective post-synaptic units.

Post-synaptic Pulse Rule: For every post-synaptic pulse generated by a unit (e.g. 122_3 in FIG. 1A), the synaptic variables corresponding to the input channel (group 120) are adjusted based on pre-post rule. The input channel group is accessed using the post-synaptic index of the pulse generating unit (e.g. 122_3), The post-synaptic pulse generated by unit 122_3 (with respect to group 120), becomes the pre-synaptic pulse for a group of downstream units, the group 118 in FIG. 1B, and units 132_1, 132_2, 132_n).

Figure 2A:
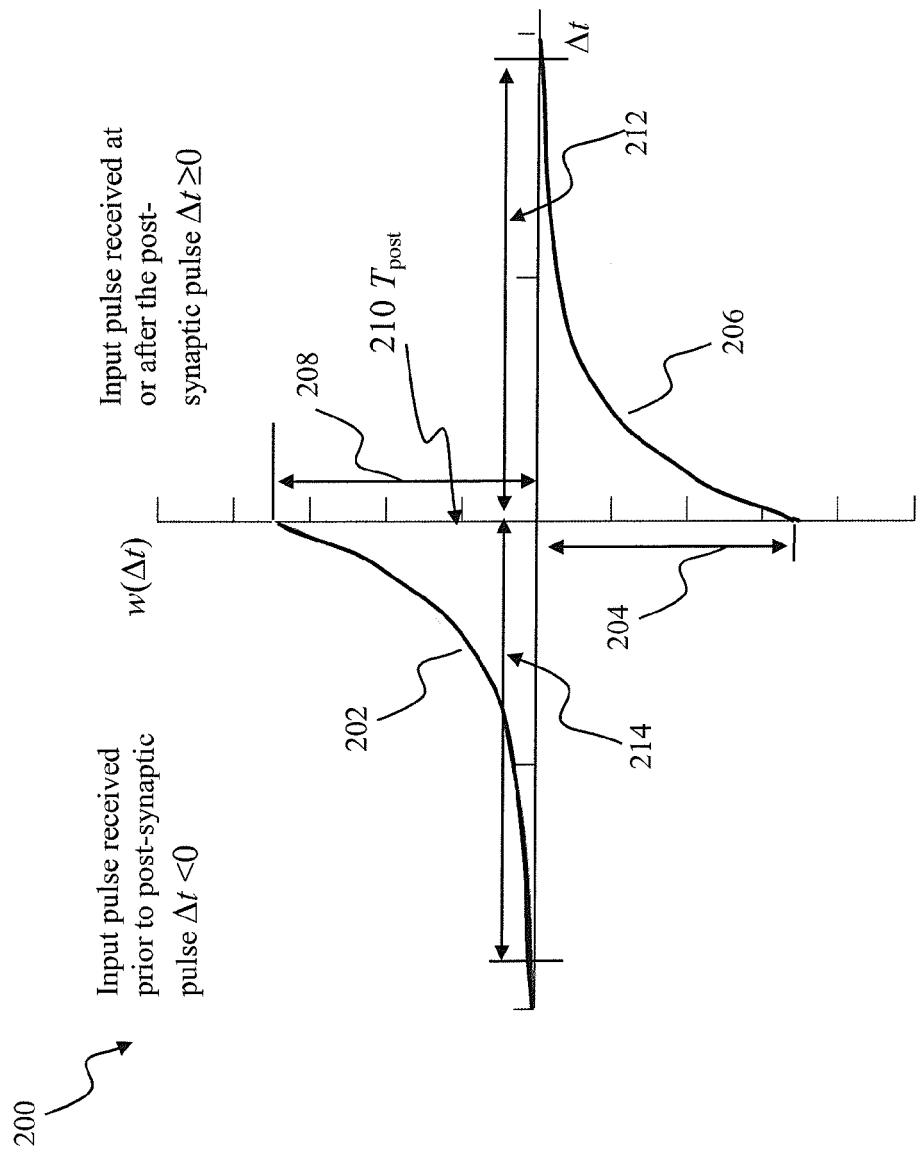
FIG. 2A is a plot illustrating one exemplary implementation of spike-time dependent plasticity rules useful with the synaptic update mechanism of FIG. 1D.

The above LTP and LTD updates are performed, for example, according to Eqns. 1-2 above, and are shown in FIG. 2A. The curve 202 in FIG. 2A depicts the change in synaptic weight $w(\Delta t)$ when the input pulse arrives before the post-synaptic pulse, and the curve 206 depicts the change in weight if the pulse arrives after the post-synaptic pulse. The adjustment implementation shown in FIG. 2A is characterized by the maximum adjustment amplitudes $A_1$, $A_2$ denoted by the arrows 204, 208, respectively. The adjustment magnitude $w(\Delta t)$ diminishes and approaches zero as the $|\Delta t|$ increases. The cumulative effect of the curve 202 is long-term potentiation of the synaptic weights (LTP), and the cumulative effect of the curve 206 is long-term depression of the synaptic weights (LTD).

Figure 2B:
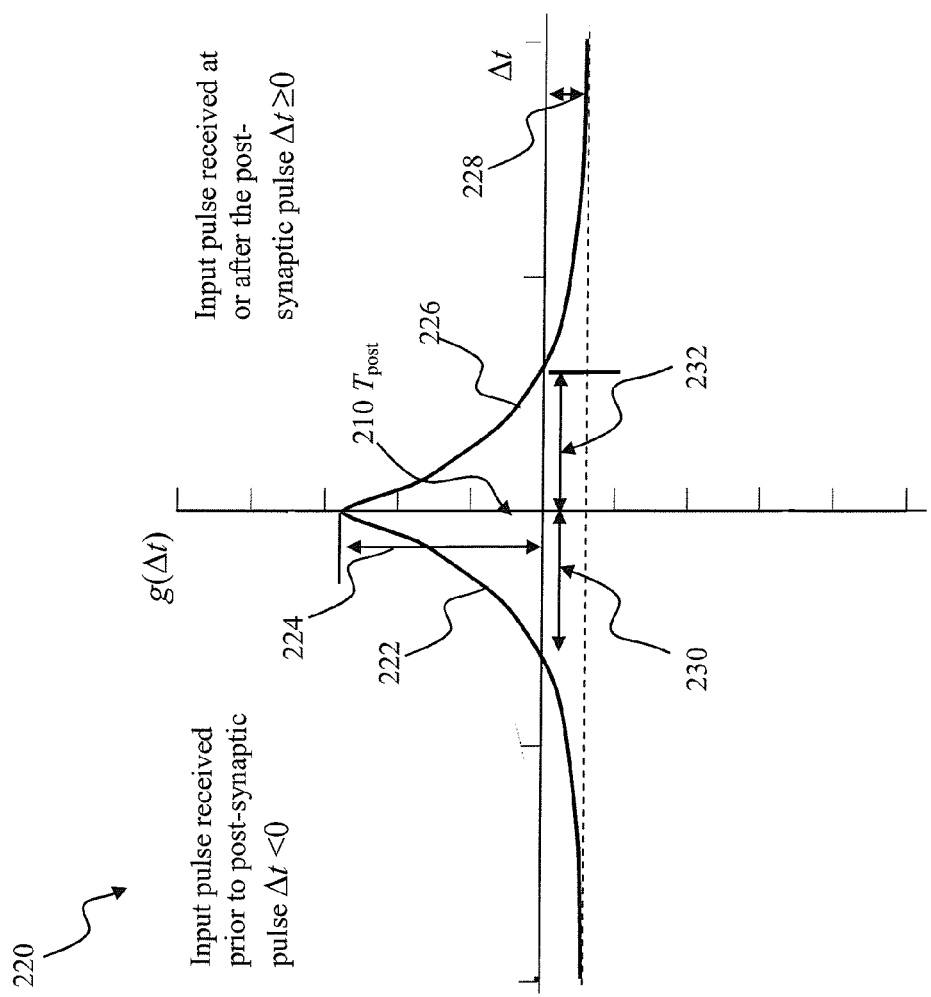
FIG. 2B is a plot illustrating another exemplary implementation of spike-time dependent plasticity rules useful with the synaptic update mechanism of FIG. 1D.

Various other STDP implementations can be used with the invention, such as, for example, the bump-STDP rule, illustrated in FIG. 2B. The bump-STDP pre-post adjustment and the post-pre adjustment curves 222, 228 are characterized by maximum potentiating amount (denoted by the arrow 224) when $\Delta t = 0$ and a finite depression value (denoted by the arrow 228 in FIG. 2B) as $|\Delta t| \gg 0$. The arrows 230 232 denote the maximum potentiation interval Tmax, that is configured based on, e.g., the temporal constraints specified by the designer. More types of STDP rules may be used consistent with the invention, such as for example those described in Abbott, L. F. and Nelson, S. B. (2000), "Synaptic plasticity: taming the beast", *Nature Neuroscience*, 3, 1178-1183, incorporated herein by reference in its entirety.

Exemplary Implementation of Spiking Network Architecture

In one aspect of the invention, and the calculation of spike-timing dependent plasticity rules is based on the relative time difference between the pre-synaptic pulse and the post-synaptic pulse. A computerized network apparatus, implementing e.g., the spiking neural network of FIG. 1A, may operate in a variety of modes to calculate these time differences.

In one embodiment, the computerized network apparatus comprises a synchronous implementation, where operation of the network is controlled by a centralized entity (within the network apparatus) that provides the time (clock) step, and facilitates data exchange between units. The arrival time of pre-synaptic pulses is derived from the synchronized time step that is available to all units and synapses within the network. Spike transmission between different units in the network can be carried out using for example direct point-to-point connection, shared memory or distributed memory communication, or yet other communication mechanisms which will be recognized by those of ordinary skill in the neurological modeling sciences given the present disclosure.

In another embodiment, the computerized network apparatus is implemented as an asynchronous network of units, where units are independent from one another and comprise their own internal clocking mechanism. In one variant of the asynchronous network, the pre-synaptic pulse timing is obtained using a time stamp, associated with the receipt of each pulse. The time stamp is derived from a local clock of the post-synaptic unit that has received the pre-synaptic pulse. In another variant of the asynchronous network, the pre-synaptic pulse timing is obtained using information related to the occurrence of the pre-synaptic pulse (such as, for example, a time stamp of the pre-synaptic unit, the channel delay and the clock offset) that may be required to obtain the pulse firing time if it is needed. One useful technique is to include the reference clock of the sending (pre-synaptic) unit with each spike. The receiving unit can accordingly adjust the timing difference based this additional timing information.

Exemplary Update Methods

Referring now to FIGS. 3 through 9C, exemplary embodiments of various approaches for efficient synaptic computation in a pulse-based learning spiking neural network are described.

Figure 3:
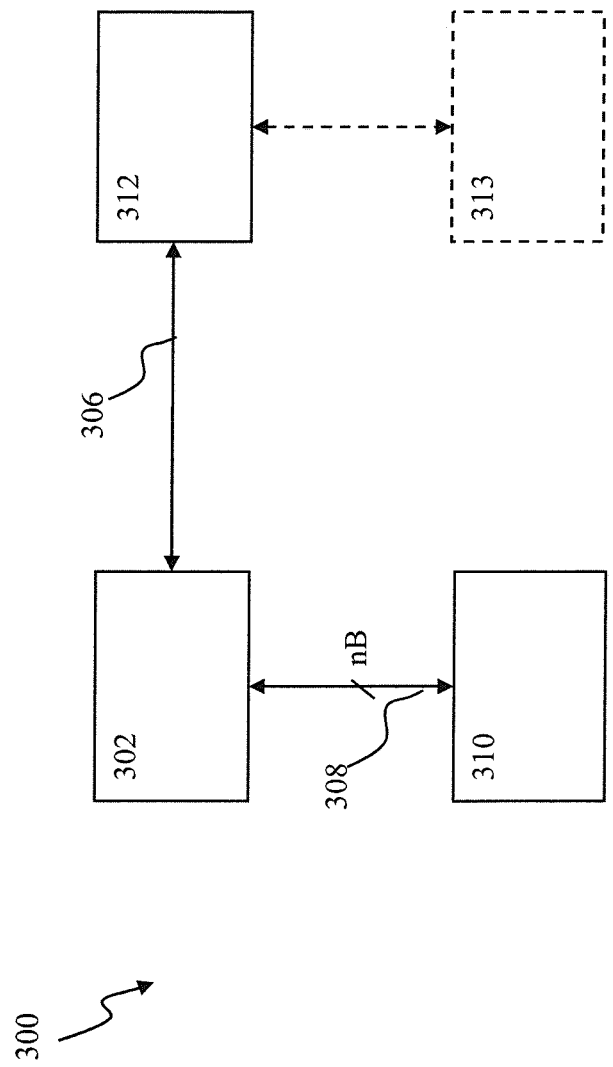
FIG. 3 is a block diagram illustrating one embodiment of neuro-synaptic network apparatus architecture.

FIG. 3 presents a high-level block diagram of an exemplary spiking neural network processing architecture 300 useful for performing synaptic updates within the network 100, described supra. Synaptic variables (such as the synaptic weights, delay, and post-synaptic neuron identification ID) are stored in a dedicated memory, termed the synaptic memory 310. The contents of the synaptic memory 310 (typically on the order of hundreds of megabytes (MB) to few Gigabytes for a 1000 unit-deep network cascade configuration) is retrieved by the synaptic computational block 302 over the synaptic memory bus 308 whenever the synaptic variables data are required to apply the post-synaptic update described above. The bus 308 width nB is typically between n1 and n2 bytes, although other values may be used. While the synaptic memory can be implemented as a part of the same integrated circuit (IC) die (on-chip) as the synaptic computational block 302, it is typically implemented as an off-chip memory. The synaptic computation block 302 implements the computation necessary to update the synaptic variables (such as 118, 120) using different types of spike-timing dependent plasticity rules.

The spiking neural network processing architecture further comprises a neuronal computation block 312 (either on the same IC as block 302, or on a separate IC) communicating with the synaptic computation block over a neuronal bus 306. The neuronal computation block implements various computations that describe the dynamic behavior the units within the network 100. Different neuronal dynamic models exist, such as described, for example, in Izhikevich, E. (2003), entitled "Simple Model of Spiking Neurons", *IEEE Transactions on Neural Networks,* 14, 1569-1572, which is incorporated herein by reference in its entirety. In one variant, the neuronal computation block 312 comprises a memory for storing the unit information, such as recent history of firing, and unit internal states. The unit also stores the firing time of the most recent pulse. In another embodiment, the neuronal memory comprising of the neuronal state is a separate memory block 313 interconnected to the neuronal computation block 312.

In order to increase synaptic data access efficiency and to maximize performance of the pulse-based network, both the size of the synaptic memory 310 and the bandwidth of the bus 308 should be efficiently utilized. As described above, synaptic variables may be stored in the synaptic memory 310 using two approaches: (i) post-synaptically indexed—that is, based on the destination unit ID; or (ii) pre-synaptically indexed—that is, based on the source unit ID. When the data is stored using one of the above indexing method (e.g., the post-synaptically indexed), memory access using the other indexing method (e.g., the pre-synaptically indexed) is inefficient, and vice versa.

FIG. 3A illustrates one embodiment of synaptic weight storage architecture that uses pre-synaptic indexing. By way of example, all of the synaptic variables for the channels delivering outputs from the unit 102_1 in FIG. 1A are stored in the pre-synaptic memory block 314. The block 314 is pre-synaptically indexed and, therefore, comprises a single contiguous memory structure as shown in FIG. 3A. Although the block 314 is illustrated as a row in FIG. 3A, it may also comprise a column or a multidimensional indexed storage block.

The synaptic variables for the channel group 118 in FIG. 1B carrying the outputs from various units, such as, the units 122_2, 122_3, 122_k are stored in the memory block 316. Because the memory 310 is pre-synaptically indexed, each row within the memory block 316 is indexed based on the source units (such as the unit 122_2 to 122_k) and not the destination unit (such as the unit 122_2). Therefore, the individual channels within the group 118 belong to different pre-synaptic units 122_2, 122_3, 122_k, as illustrated in FIG. 1B. Accordingly, the synaptic variables corresponding to the group 118 are distributed within the n×m memory structure, such that each row (or column) of the block 316 contains a single element storing synaptic variable from the group 118, as shown in FIG. 3A.

As a result, in order to implement the pre-synaptic pulse based synaptic updates of synaptic variables of the group 120 in response to a pre-synaptic pulse generated by the unit 102_1, the exemplary embodiment of the synaptic computational block 302 is required to perform the following operations:

retrieve the synaptic variables of the group 120 from the memory block 314 (a single read operation of n elements) from the synaptic memory 310;

(ii) update synaptic variables of the group 120 using the post-pre STDP rule;

(iii) store the synaptic variables in the memory block 314 (a single write operation of m elements) to the synaptic memory 310; and (iv) deliver the pre-synaptic pulse to the post-synaptic units (122_2, 122_3, . . . , 122_k) adjusting the pulse amplitude (and or delay) based on the updated synaptic variables at step (ii), Similarly, in order to implement the pre-post STDP update updates of synaptic variables of the group 118 for a post-synaptic pulse generated by unit 122_3, the exemplary synaptic computational block is required to perform the following operations:

(i) retrieve the synaptic variables 118 from the memory block 316 (m-single element read operations) from the synaptic memory 310;

(ii) update the synaptic variables 118 using pre-Post STDP rule; and (iii) store the synaptic variables in the memory block 316 (m-single-element write operations) to the synaptic memory 310.

In one embodiment (shown in FIG. 3B), the synaptic variables for every synaptic connection (such as the connection 108 in FIG. 1A) are used to describe various connection properties such as one or more connection weights 322, 332, connection delays 324, 334, target node (unit) identification 326, plasticity variables 328, 330 (such as parameters used by STDP rules described, for example, with respect to FIG. 2 supra), and spare memory 340 that may be used for compatibility during network revisions. During synaptic computation for operations like spike delivery or retrieving neural state information, the neuronal state is accessed using the post-neuron identification. During a memory transaction on the neuron bus (such as, for example, the bus 306 of FIG. 3) several different neuronal variables are accessed or updated.

In another embodiment (shown in FIG. 3C), the synaptic variables for every synaptic connection (such as the connection 108 in FIG. 1) are grouped into two categories: permanent 345 and transient 346. In most spike-based learning system, the connection variables are updated using synaptic plasticity rules during the learning or training phase. Both the transient and permanent variables are updated during the active learning phase. Once the learning phase finishes, the transient variables are not used for computation. The permanent variables (e.g., the source and the destination unit ID, synaptic weights) are accessed or used throughout the lifetime of the synaptic connection; that is, the time span over which the connection 108 configuration remains unchanged. In the exemplary embodiment of FIG. 3C, these two types of fields are stored separately in memory as permanent fields 345 and transient fields 346. Once the learning phase saturates, the transient synaptic variables are no longer updated, and hence are not retrieved, thereby reducing the bus 308 transaction load. If the transient and permanent fields are not distinctively separated in memory (FIG. 3B), unwanted fetching of transient variables from the synaptic memory when only permanent variables are necessary for computation results. If the given network has on average M connections and each synaptic connection is represented by P permanent variables and T transient variables, then the approach described above reduces the total required bandwidth by a factor of (1+T/P).

Figure 4:
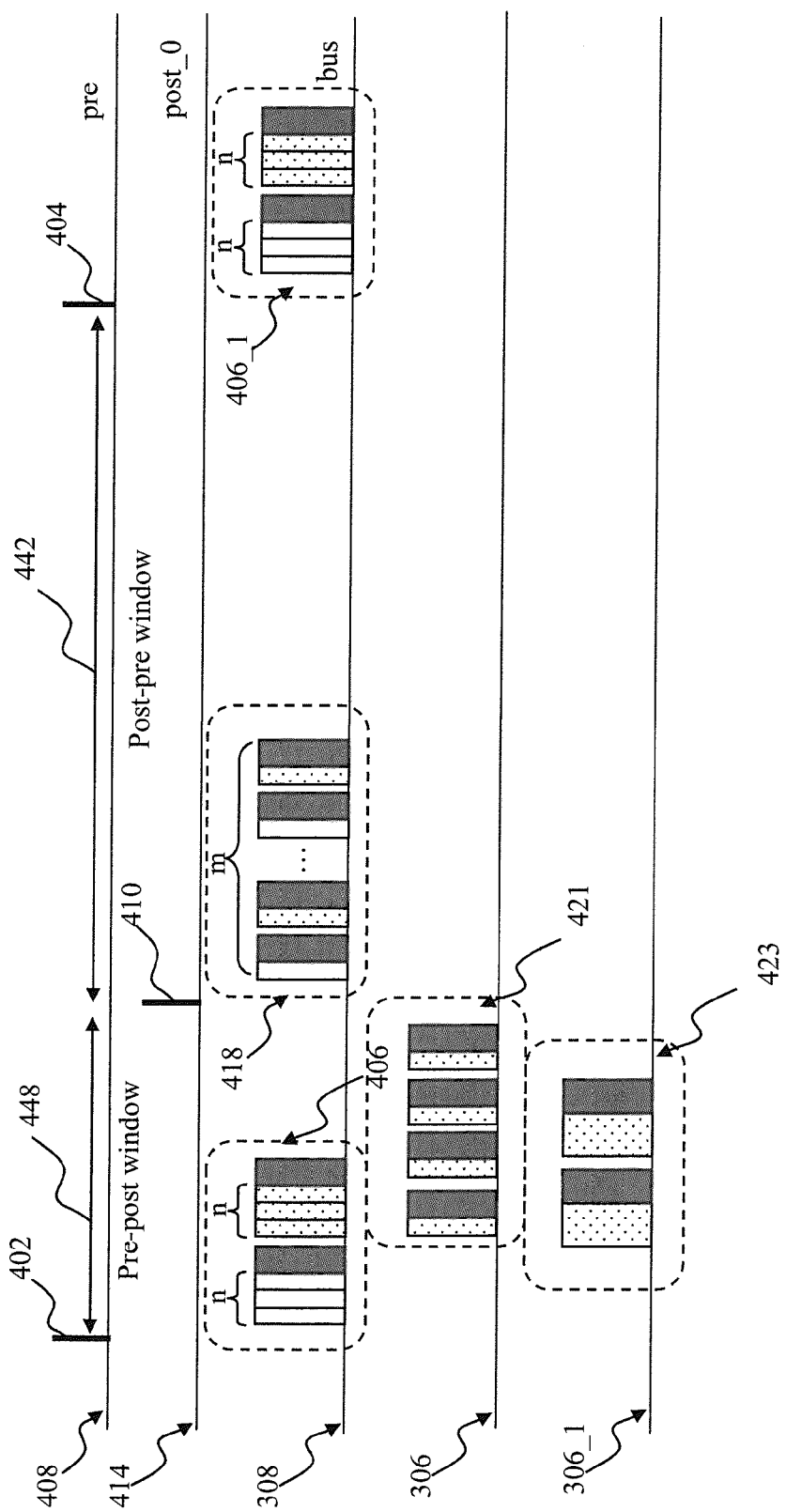
FIG. 4 is a graphical illustration depicting one embodiment of synaptic memory bus transactions useful with the synaptic update mechanism of FIG. 1D.

One embodiment of pre-synaptically indexed synaptic memory implementation associated with the pre and post synaptic updates is illustrated in FIG. 4, which depicts synaptic memory bus 308 activity for a single pre-synaptic channel 408 and a single post-synaptic channel 414. When the pre-synaptic pulses 402 (e.g., generated by unit 102_1 in FIG. 1A) is received by post-synaptic units (e.g., 122_2, 122_3, . . . 122_k in FIG. 1A) the synaptic variables of the channel group (e.g., 120 in FIG. 1) are updated, as illustrated by the bus transaction 406 in FIG. 4. When the post-synaptic pulse 410 is generated by the unit 122_3, the synaptic variables of the channel group (pre-synaptic variables connected to unit 132_2) are updated, as illustrated by the bus 308 transactions 418 in FIG. 2A. The update transaction 418 comprises synaptic variable adjustment computed based on the time window 448 between the pre-synaptic pulse 402 and the post-synaptic pulse 410, as described with respect to FIG. 1D supra.

Similarly, when another pre-synaptic pulse 404 (generated by unit 102_1) is received by various units, the synaptic variables of the channel group (such as the group 120 in FIG. 1A) are updated, causing another bus transaction 406_1. The update transaction 406_1 comprises synaptic variable adjustment computed based on the time window 442 between the pre-synaptic pulse 404 and the post-synaptic pulse 410.

Figure 4A:
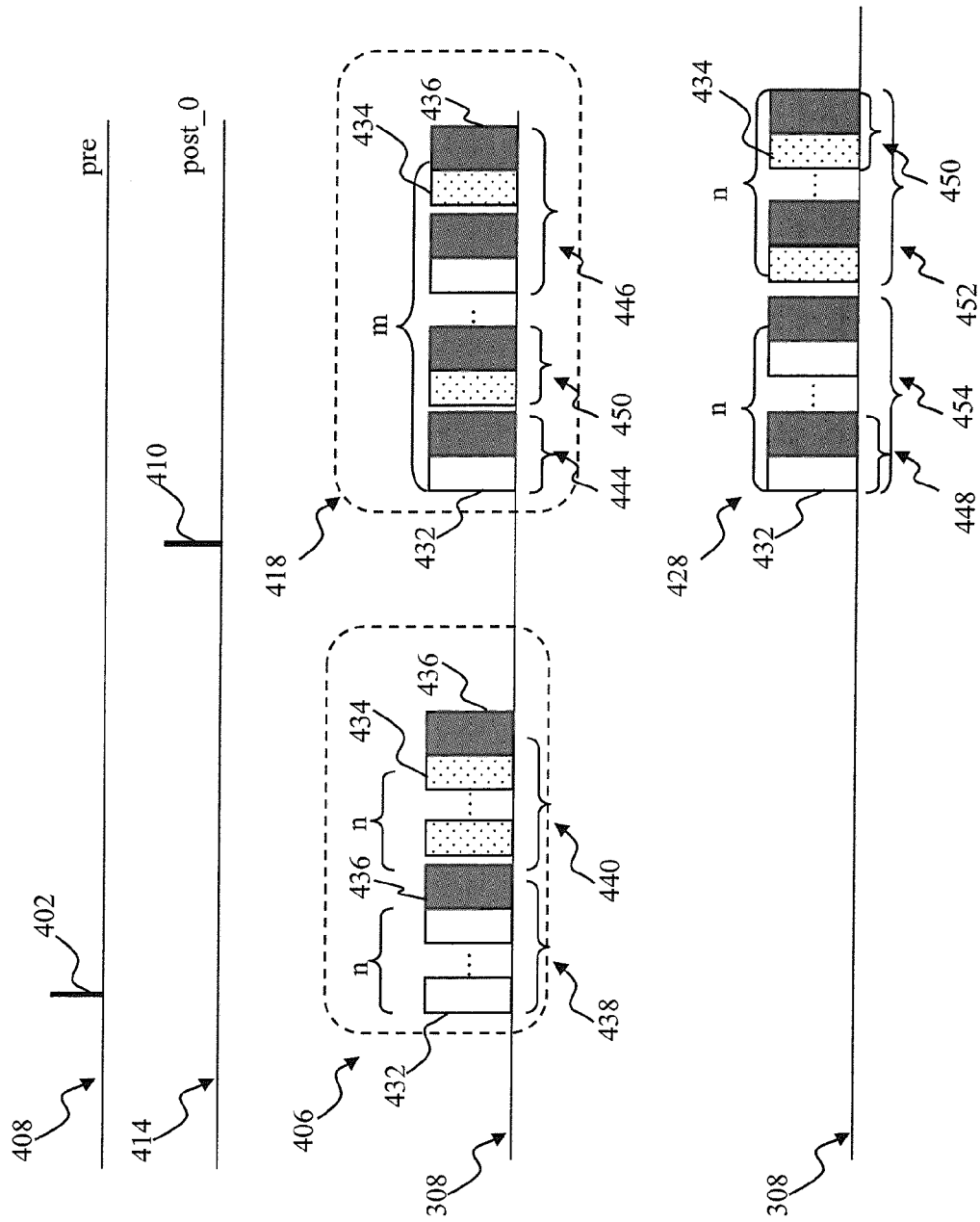
FIG. 4A is a graphical illustration depicting structure of bus transaction packets of FIG. 4.

The detailed structure of the pre-synaptic bus transactions 406 and the post-synaptic bus transactions 418 is shown in FIG. 4A. Because the synaptic memory (e.g., memory 310 in FIG. 3A) is pre-synaptically indexed, the pre-synaptic data transactions 406 are advantageously performed in an efficient manner. That is, for each update, the synaptic processing unit reads the pre-synaptic variable block (such as the elements 120 of the post-synaptic block 314 in FIG. 3A) in a single read operation 438 comprising reading a block of m-elements 432, each element containing synaptic variable data for a specific pre-synaptic connection. Upon performing required update computations, the synaptic processing unit (e.g., the unit 302 in FIG. 3) writes the updated pre-synaptic variables in a single write transaction comprising a single write operation 440 of a block of in-updated elements 434. Each read/write transfer 438, 440 comprises an overhead portion associated with low level memory access operations, including, inter alia, opening memory bank, row pre-charge, etc. As a result, the pre-synaptic update memory transaction 406 comprises two memory access operations: one read and one write.

Contrast the transaction 406 with the post-synaptic update transactions 418, 428 shown in FIG. 4A. Because the memory (such as the synaptic memory array 310 in FIG. 3A) is pre-synaptically indexed, access to the post-synaptic variables (such post-synaptic block 316 in FIG. 3A) occurs in one row-at-a time manner. That is, each of the array 316 elements is accessed in a sequential manner (one at a time), resulting in m-read accesses 444 and n-write accesses 450 as shown in FIG. 4A. As a result, the post-synaptic update memory transaction 418 comprises 2×n memory access operations: n-read and n-write. Although read/write operations may be interleaved as shown in the memory transaction 418 in FIG. 4A, or block-oriented, as shown by in read operations are followed by m write operations of the memory transaction 428, given that each read/write access comprises an overhead portion 436 (which may take longer than memory access time 432, 434 for each element) the post synaptic update is a scattered traverse of discontiguous areas of the post-synaptic memory block 316 which is very inefficient, and results in a substantial waste of memory bandwidth.

Figure 4B:
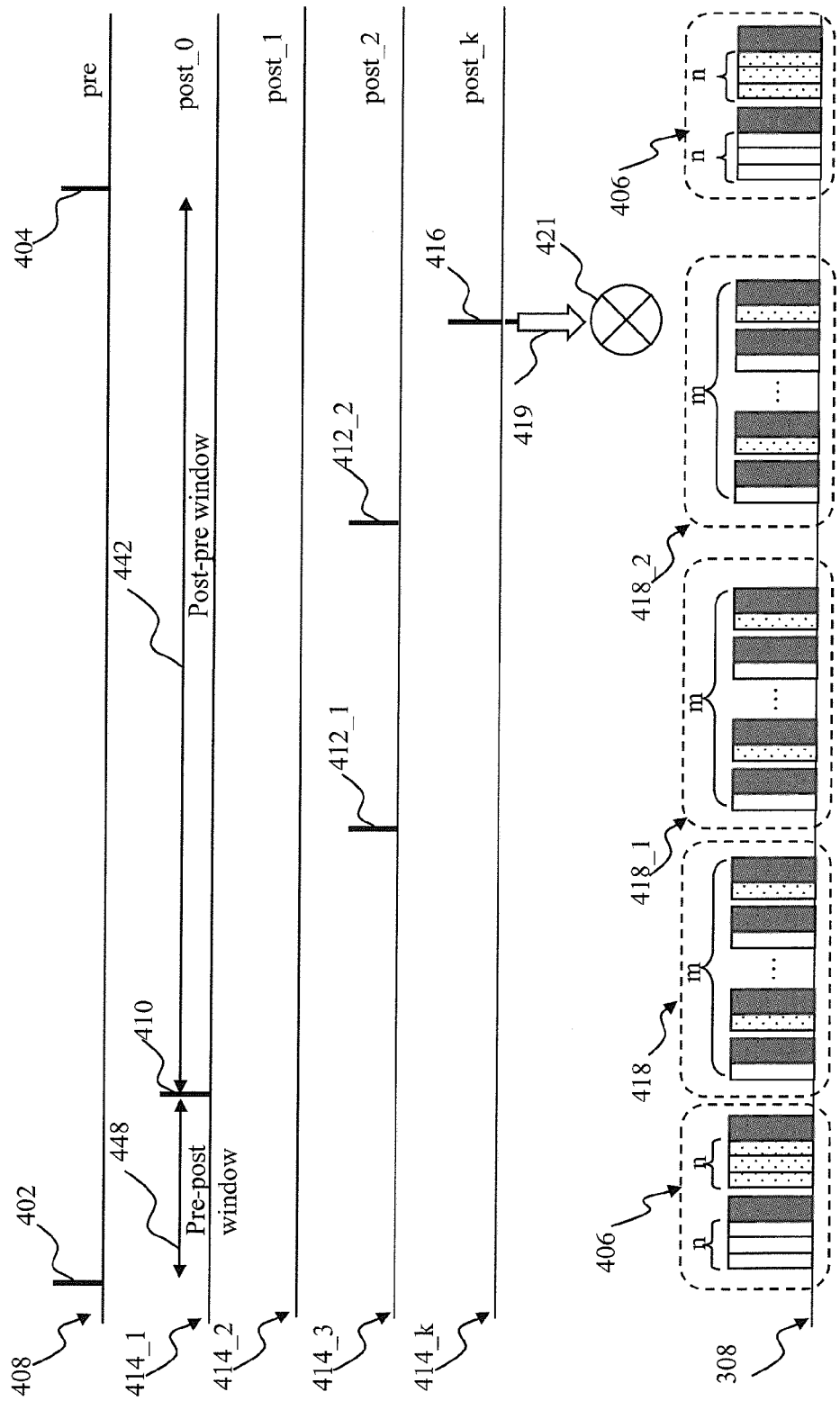
FIG. 4B is a graphical illustration depicting one embodiment of synaptic memory bus transaction activity generated for a large number of post-synaptic updates.

Such fragmented access of the post-synaptic memory block becomes even less efficient when multiple post-synaptic pulses are generated by different post-synaptic units (such as, for example, the units 122_1, 122_2, 122_k in FIG. 1) as illustrated in FIG. 4B. Each post-synaptic pulse 410, 412_1, 412_2 (on the channels 414_1, 414_k) causes post-synaptic update transactions 418, 418_1, 418_2.

Typically, the memory bus (308 in FIG. 3) supports efficient transfer of large-chunk of data (called burst of memory access). A memory bus can be a wide bus (e.g. 512-bit wide) and can concurrently transfer a large amount of sequential data. If the memory bus is used to transfer one 64-bit data element, the remaining bits in the memory bus are invalid (unused), and effective data-transfer is only 64/512 of the maximum bandwidth.

Memory access during post-synaptic updates described with respect to FIG. 4A comprises many small-sized accesses (one memory access for each synapses), the overhead associated with each memory access results in a large portion of the memory bus bandwidth being wasted on non-productive activity, thereby reducing bus 308 throughput. Such fragmented access of the synaptic memory further reduces bus use efficiency as the number of post-synaptic pulses increases (as illustrated by the pulses 412 in FIG. 4B). Multiple fragmented memory accesses (caused by the post-synaptic pulse updates) reduce bus availability and may cause a bus collision condition (indicated by the circle 421 in FIG. 4B), when bus data transfer request 419 in response to a post-synaptic pulse 416 is generated while the bus transaction 418_2 due to a prior pulse 412_2 is still in progress.

Figure 5A:
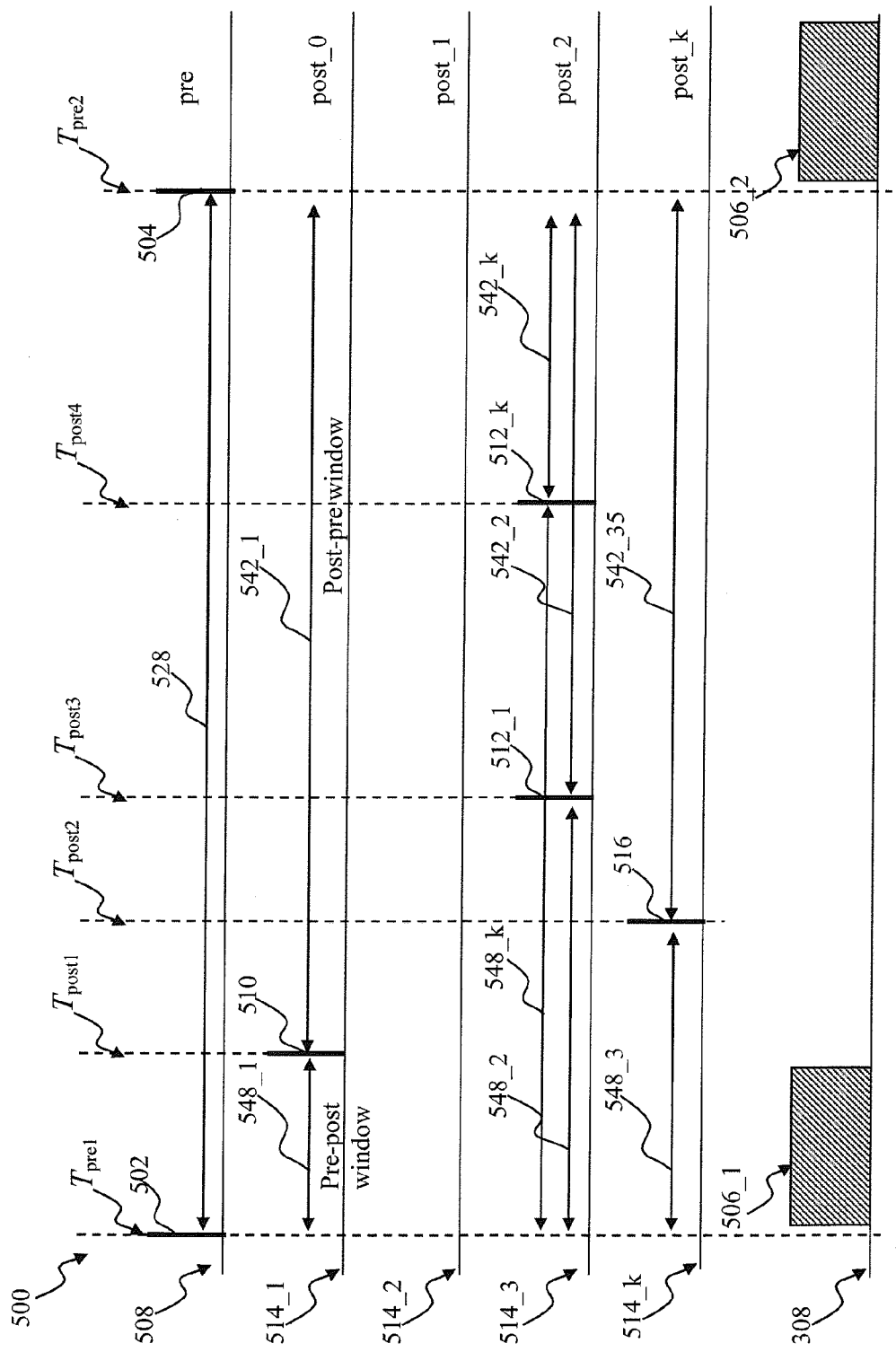
FIG. 5A is a graphical illustration depicting one embodiment of a lazy synaptic update method according to the invention.

One embodiment of memory access architecture according to the invention, referred to as the "lazy synaptic update", for use in pulse coded artificial spiking neural networks, is illustrated in FIG. 5A. Similar to the memory access scheme described with respect to FIG. 4 supra, when a pre-synaptic pulse 502 in FIG. 5A is received by a unit (e.g., the unit 122_3 in FIG. 1A), the synaptic variables are updated, as illustrated by the bus 308 transaction 506_1 in FIG. 5A. However, the post-synaptic update is not executed immediately upon generation of the post-synaptic pulse 510 on channel 514_1, but is delayed until the next pre-synaptic pulse 504 is received by the post-synaptic unit (e.g., the unit 122_3 in FIG. 1A), as indicated by absence of the bus 308 transaction activity corresponding to the pulse 510 in FIG. 5A. Similarly, synaptic updates corresponding to the post synaptic pulses on channels 514_3, 514_n are delayed until the receipt of the next pre-synaptic pulse 504 by the unit, at which time the pre-post and the post-pre synaptic updates are performed.

At the time the first pre-synaptic-based update transaction 506_1 is executed, the post-synaptic timing information for the pulses 510, 512, 516 in FIG. 5A is not available. Hence, the second synaptic update transaction 506_2 is required to perform two updates for each preceding post-synaptic pulses generated within the time window 528: (i) the pre-post updates, and (ii) the post pre updates. The pre-synaptic variable update is structured as follows: for every pre-synaptic pulse (e.g., 504), the pre-post update rule (i.e., using the time window 548_1 in FIG. 5A and Eqn. 1) is evaluated first, followed by the post-pre update rule (i.e., using the time window 542_1 in FIG. 5A and Eqn. 2).

In order to enable delayed post-synaptic update, generation time for all post-synaptic pulses is recorded. In one variant, the exact timing of every post-synaptic pulse is stored in a memory buffer of the respective post-synaptic unit (e.g., the unit 122_3 of FIG. 1A stores the timing of the pulses 512_1 through 512_k of FIG. 5A). This timing information is provided to the synaptic processor (for example, the processor 302 in FIG. 3) when the subsequent pre-synaptic pulse 504 arrives at the unit 122_3.

In one variant, the unit firing timing information is stored using the absolute time for each of the pulses. In another variant, the timing information is stored using an offset relative to a reference event in order to reduce memory required to store the pulse firing timing information. In yet another variant (particularly useful with a synchronous iterative network processing implementation), a circular bit-vector is used to store the recent firing history, where each bit corresponds to a processing iteration of network computations (a step), and the bit value indicates the unit firing status ('0' unit did not fire, and '1' unit fired).

Memory access of pre-synaptic transaction 506 is structured similarly to the bus transaction 406, described in detail with respect to FIG. 4A, supra. The pre-synaptic indexing of synaptic memory (such as the memory 310 in FIG. 3A) and the order of synaptic updates of the method of FIG. 5A described above, allow the update transaction 506 to be executed using a single read and a single write memory operation (e.g., the operations 438, 440 in FIG. 4A). That is, synaptic variables are updated for all post-synaptic pulses within the time window 528 between the two successive pre-synaptic pulses 502 and 504 in a single block read/write, thus advantageously incurring only small overhead for the entire transactions. As a result, synaptic variable method illustrated in FIG. 5A requires only a single read/write memory operation (from external memory to local memory) of synaptic variables per each window 528 and it advantageously reduces memory access fragmentation as all memory transactions 506 are performed using contiguous blocks 438, 440, thereby reducing the amount of overhead associated with multiple memory accesses.

Comparing the bus transaction 308 activity shown in FIG. 5A and FIG. 4B, advantages of the spiking neural networks update approach of embodiment of FIG. 5A is further evident when a large number of post-synaptic pulses is generated. The update embodiment of FIG. 5A advantageously: (i) consolidates all intermediate post-synaptic update transactions 418 in FIG. 4B into a single transaction 506 in FIG. 5A; and (ii) uses a single block access 438, 440 when performing the update transaction. Such single block access is enabled by the pre-synaptic indexing architecture of the synaptic memory block 310. Overall, the update approach illustrated in FIG. 5A reduces the number of synaptic memory bus transactions and, hence, the total transaction overhead. By way of example, when S is the number of bus cycles for transferring variables from one synapses (without overhead), M is the number of synapses within one group, and BO is the number of additional bus overhead cycles (BO) for each transfer, the total number of bus 308 cycles (NC) required for performing synaptic updates for each pre-synaptic pulse is approximately equal to NC=(S×M+BO), when using the approach illustrated in FIG. 5A. Contrast this with the total number of bus cycles (NC0) when performing synaptic updates using methodologies of (such as, for example, approach illustrated in 408) is NC0=(S+O)×M. The overall improvement of bus utilization (BU) using the synaptic update approach according to the embodiment of the invention illustrated in FIG. 5A, when compared to the fragmented or un-coalesced memory transactions of the prior art, is given by:

$$I=(S+O)\times M/(S'M+O).$$ (Eqn. 3)

For S=10 cycles, BO=10 cycles, and M=100 nodes, the improvement is on the order of two. Such substantial improvement advantageously allows for processing of additional pulses, additional connections for with the same hardware when compared to prior art. Alternatively, the bus usage improvement of the present allows the use of less complex (and less costly) hardware to implement the same functionality as the solutions of prior art.

An underlying reason which allows the delayed implementation of the post-synaptic updates as illustrated in FIG. 5A is the asymmetric nature of information propagation through the spiking neural networks from a pre-synaptic unit to a post-synaptic unit. Synaptic weight changes due to both pre-pulse and post-pulse based on the relative timings. For every pre-pulse, along with the weight change, the synaptic weight needs to be delivered to the post-synaptic unit. In contrast, for the given post-synaptic pulse, the synaptic weight need to be changed based on the pulse-timing, but need not delivered to any other unit. Because the information flow through the network happens from pre-synaptic unit to the post-synaptic unit, it is required for correct network operation that all of the channel pre-synaptic updates are executed immediately upon arrival of each pre-synaptic pulse, as the pre-synaptic channels are continuously providing inputs to the unit (e.g., unit 122_3) and an un-timely update of the pre-synaptic channel variables adversely affects the accuracy of updates due to subsequent inputs (for example, the pre-synaptic pulse 504 in FIG. 5A). On the other hand, the post-synaptic variable update (for example, due to the pulse 510) can be postponed until it is needed by the unit (that is, the time of the next pre-synaptic pulse that delivers the updated variables) without incurring any degradation in accuracy of network data propagation.

While the postponement of post-synaptic updates according to the exemplary embodiment of the invention requires additional memory for storing the post-synaptic pulse generation times, the amount of additional storage is determined by the maximum number of expected post synaptic pulses and can be easily accommodated by the neuronal memory block which stores the remaining neuronal state variables. The postponement of post-synaptic updates advantageously obviates synaptic memory bus transaction (associated with the post-synaptic pulse generation) as the unit no longer requires reading and writing of the synaptic variables.

Figure 5B:
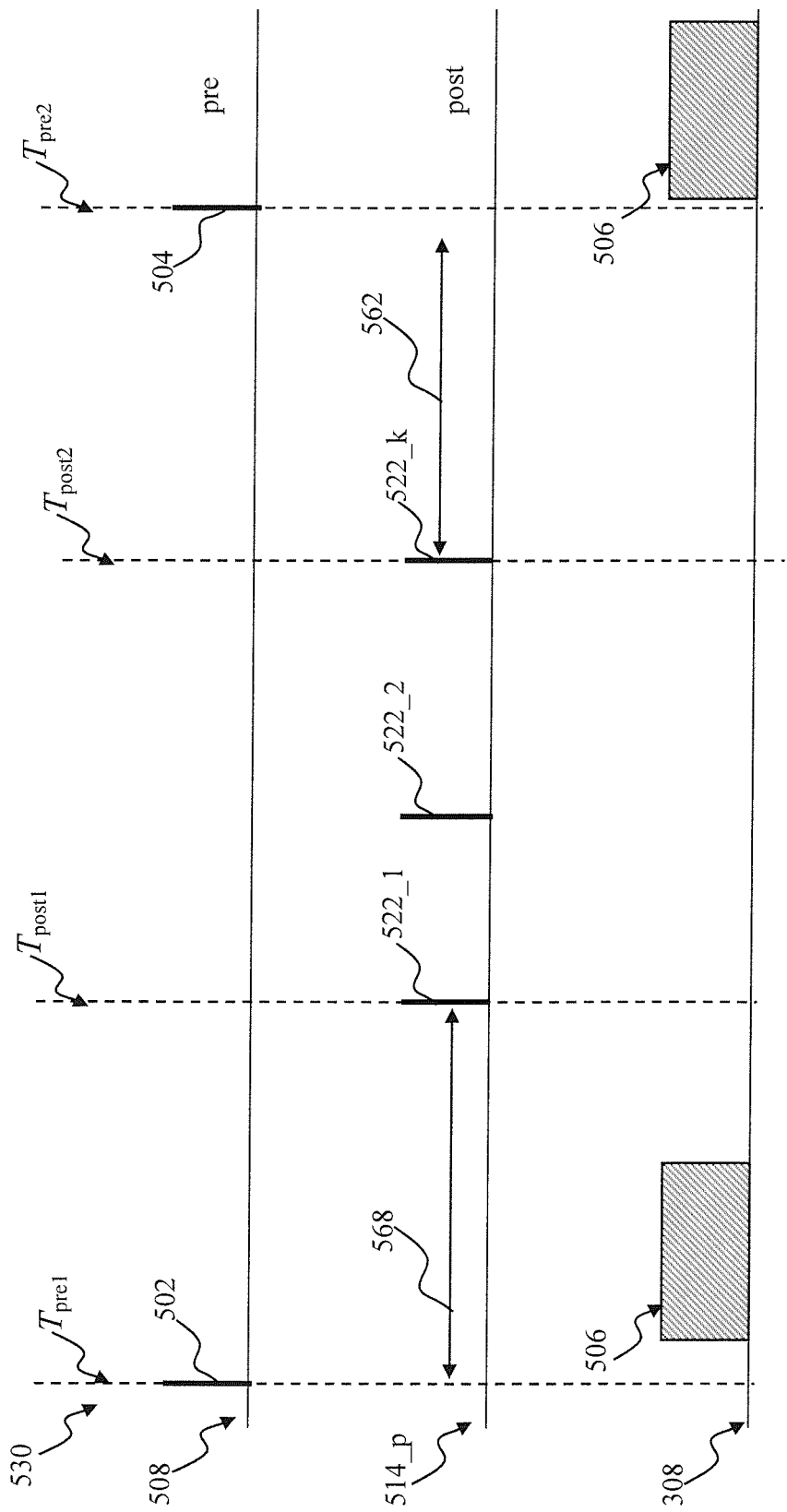
FIG. 5B is a graphical illustration depicting one embodiment of lazy synaptic update method of the invention for a large number of post-synaptic pulses.

In another embodiment, shown in FIG. 5B, the synaptic memory block access is further optimized by using a technique referred to as the "nearest neighbor update". Specifically, the pre-post synaptic update rule (such as the update 148 in FIG. 1D) is only applied to the first post-synaptic pulse 522_1, as indicated by the arrow 568 in FIG. 5B. Similarly, the post-pre update (such as the update 142 in FIG. 1D) is only performed for the last post-synaptic pulse 522_k, as indicated by the arrow 562 in FIG. 5B.

Synaptic Update Methods Based on System Event

The previous embodiments of memory access during synaptic updates described with respect to FIGS. 5A-5B require that each post-synaptic unit maintain a finite history of the post-synaptic activity timing within the time window 528 between the two consecutive pre-synaptic pulses (such as, for example, the pulses 502, 504). The post synaptic history is maintained by each unit (e.g., the unit 122_3 in FIG. 1A), and updated after every firing operation. Given that a typical network 100 of FIG. 1A comprises many millions of units, it is desirable to implement each unit using the smallest practical memory buffer size Nbuf, for example, between 10 and 1000 bits. A situation, when the pre-synaptic activity is much slower comparing to the post-synaptic unit activity may produce an overflow of the pulse history buffer when the number of post-synaptic pulses (e.g., the pulses 512 in FIG. 5A) becomes larger than the maximum allowed by the buffer size Nbuf This, in turn, causes an erroneous update of the synaptic variables by the unit 122 when the next pre-synaptic pulse arrives at the unit.

Figure 6A:
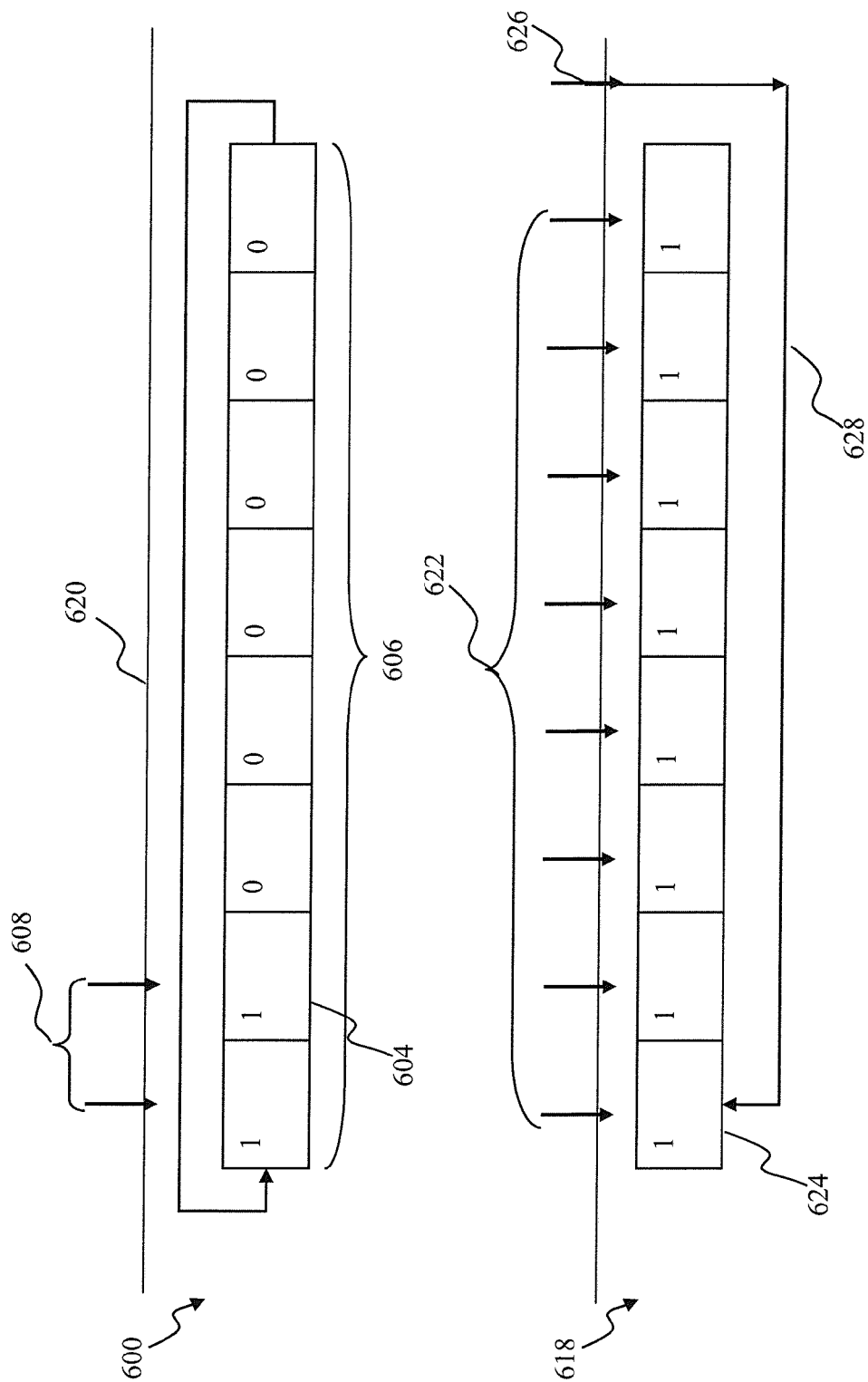
FIG. 6A is a graphical illustration depicting one embodiment of pulse buffer useful with the lazy synaptic update mechanism the FIG. 5A.

In one such implementation of the unit, the post-synaptic pulse history is stored locally at each unit using a circular buffer of size 606, as illustrated in FIG. 6A. The buffer 600 comprises a set of elements 604, each of which stores the generation time of consecutive post-synaptic pulses 608. When the buffer is filled up (as indicated by the plate 620 in FIG. 6A) by a series of post-synaptic pulses 622, the next post-synaptic pulse 626 overwrites the memory location corresponding to one of the prior post-synaptic pulses, as depicted by the arrow 628 in FIG. 6A. Hence, a portion of the post-synaptic pulse history is lost.

Figure 6B:
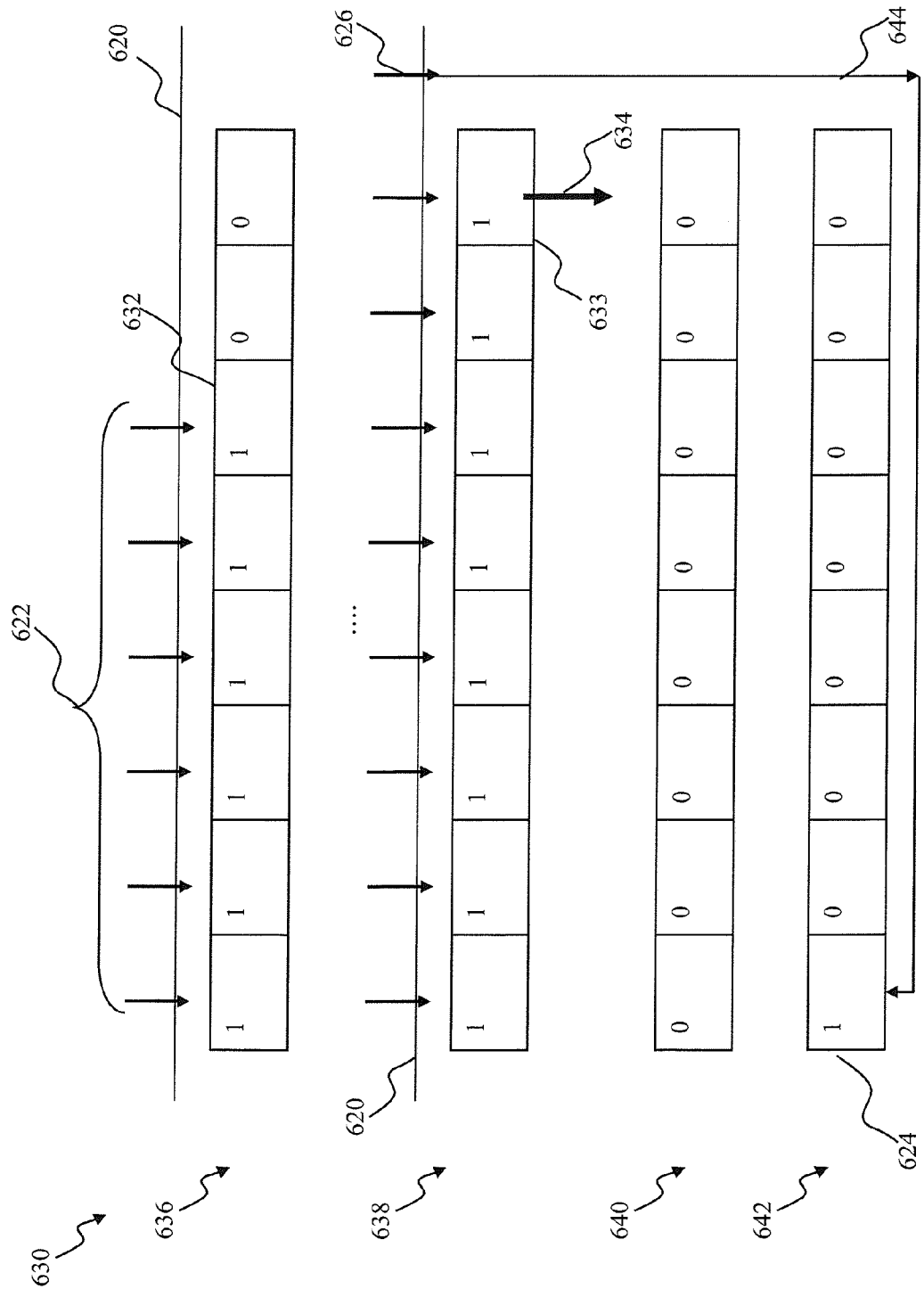
FIG. 6B is a graphical illustration depicting one embodiment of a buffer overflow system event generation method of the invention.
Figure 6C:
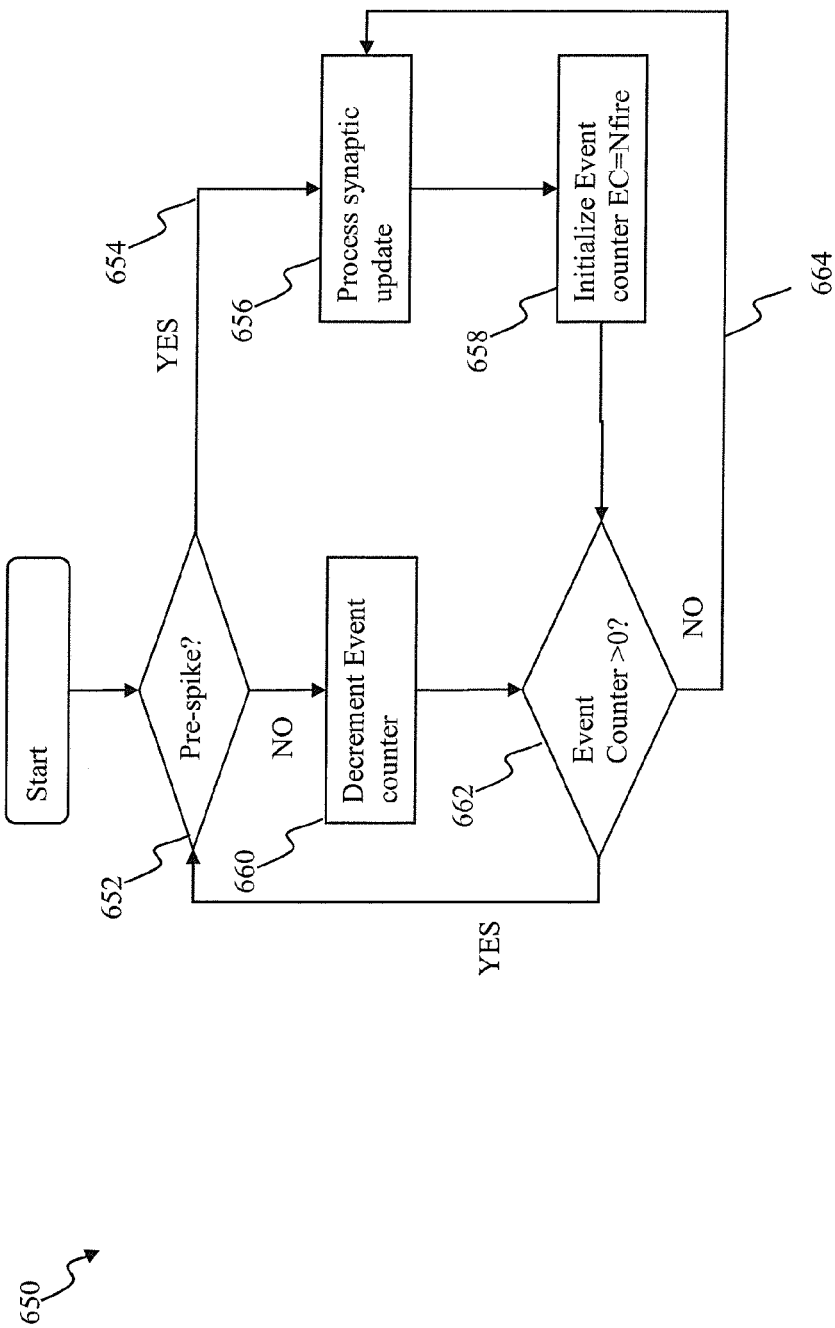
FIG. 6C is a graphical illustration depicting one embodiment of a flush system event generation method according to the invention. p

Referring now to FIGS. 6B-6C, various embodiments of a method configured to enable spiking neural network operation when the pre-synaptic and post-synaptic pulse rates are substantially different from each other, are shown and described. The method generally utilizes system events, configured to ensure that timely synaptic updates are effected and to prevent post-synaptic pulse history loss due to history buffer overflow. The system events are triggered due to a variety of conditions that depend upon specific implementations, as described below.

FIG. 6B illustrates one embodiment of a method which utilizes buffer overflow system events. The method 630 comprises, at step 636 monitoring a counter which stores the position of the last used buffer element 632 (corresponding to the number of post-synaptic pulses generated by the unit since the last synaptic update. In one variant, the last synaptic update is effected by the receipt of the pre-synaptic pulse as described in detail with respect to FIG. 5A, supra. In another variant, the last synaptic update is effected by a previous system event, such as the system event 634 described below.

At step 638, when the counter equals the buffer size 606 (indicating that the end of the buffer 633 is reached) a system event (depicted by the arrow 634) is generated. Responsive to the system event 634, at step 640 synaptic update is performed, and the counter is reset to the beginning of the buffer.

The standard plasticity rule shown in FIG. 2A, has a finite time window 214, 212, and pre-post pulse pair that fall within this window changes the synaptic variables based on time difference between the two pulses ($\Delta t$). If the post-pulses are generated such that $\Delta t$ is greater than the time window, then no synaptic variable update need to be performed until the occurrence of the next pre-synaptic pulse.

In certain applications, it is required that a synaptic update is performed for every post-synaptic pulse. Such mechanism is particularly useful for synaptic plasticity rules that continue to adapt synaptic variables even for long plasticity time scales, such as the bump-STDP rule shown in FIG. 2B, supra. The bump-STDP update magnitude converges to a non-zero value even for large values of $\Delta t$, as illustrated in FIG. 2B. As a result, every post-synaptic spike causes either an increase or decrease of the synaptic weight (FIG. 2B shows only the decrease part of the synaptic weight), and is referred to as the "long-tail plasticity rule". When using lazy-update scheme with long-tail plasticity rules (such as FIG. 2B), periodic forced synaptic weight updates are required in order to take into account all the post-synaptic pulses until the next pre-synaptic pulse.

FIG. 6C illustrates one embodiment of a network operation method 650 that utilizes system flush events in order to force synaptic variable update when the given unit has not fired for $N_{fire}$ time steps.

At step 652 of the method 650, the unit determines if it has fired or not. If the unit has fired, then a pre-synaptic pulse is generated by the unit and the method 650 proceeds via the pathway 654 and causes the pre-spike to invoke the necessary post-pre STDP update rule 656. In one variant, the synaptic memory update comprises synaptic bus transaction 506, described with respect to FIG. 5A, supra. The unit then updates the internal state that happens after firing a spike (termed "reset rule"). Next, at step 658 of the method 650, a pulse counter is initialized to value $N_{fire}$ corresponding to the maximum allowable number of time step after which the post-synaptic updates will be invoked (otherwise the timing information stored in the post-synaptic side will be lost due to overflow).

If the check step 652 determines that no pulse has been generated by the unit, then the method 650 decrements the event counter at step 660. At step 662, a check is performed in order to determine if the event counter is greater than zero. If it is, then the unit operation continues to the step 652. If the pulse counter is equal to zero (indicating that the $N_{fire}$ time-steps has elapsed since the last update), then the flush system event 664 is generated and unit/network operation continues to the step 656, as shown in FIG. 6B. The flush system event triggers a synaptic update computation, and ensures that all timing information of the post-synaptic neuron is accounted before being removed from the buffer history. Upon receiving the flush system event, only the pre-post STDP update rules are executed corresponding to all the post-synaptic pulses that occurred in the time interval $T_{flush} - T_{pre1}$ (see FIG. 7A, discussed below). The post-pre STDP update rule need not be applied, because the pre-synaptic pulse has not yet been generated.

As described with respect to FIG. 5A supra, in order to maintain accurate lazy updates, the post-synaptic pulse generation (firing) time history should not be lost between successive pre-synaptic pulses. In order to prevent firing history loss, a flush system event is generated by the pre-synaptic unit if the pre-synaptic neuron has not fired for $N_{fire}$ steps.

Figure 7A:
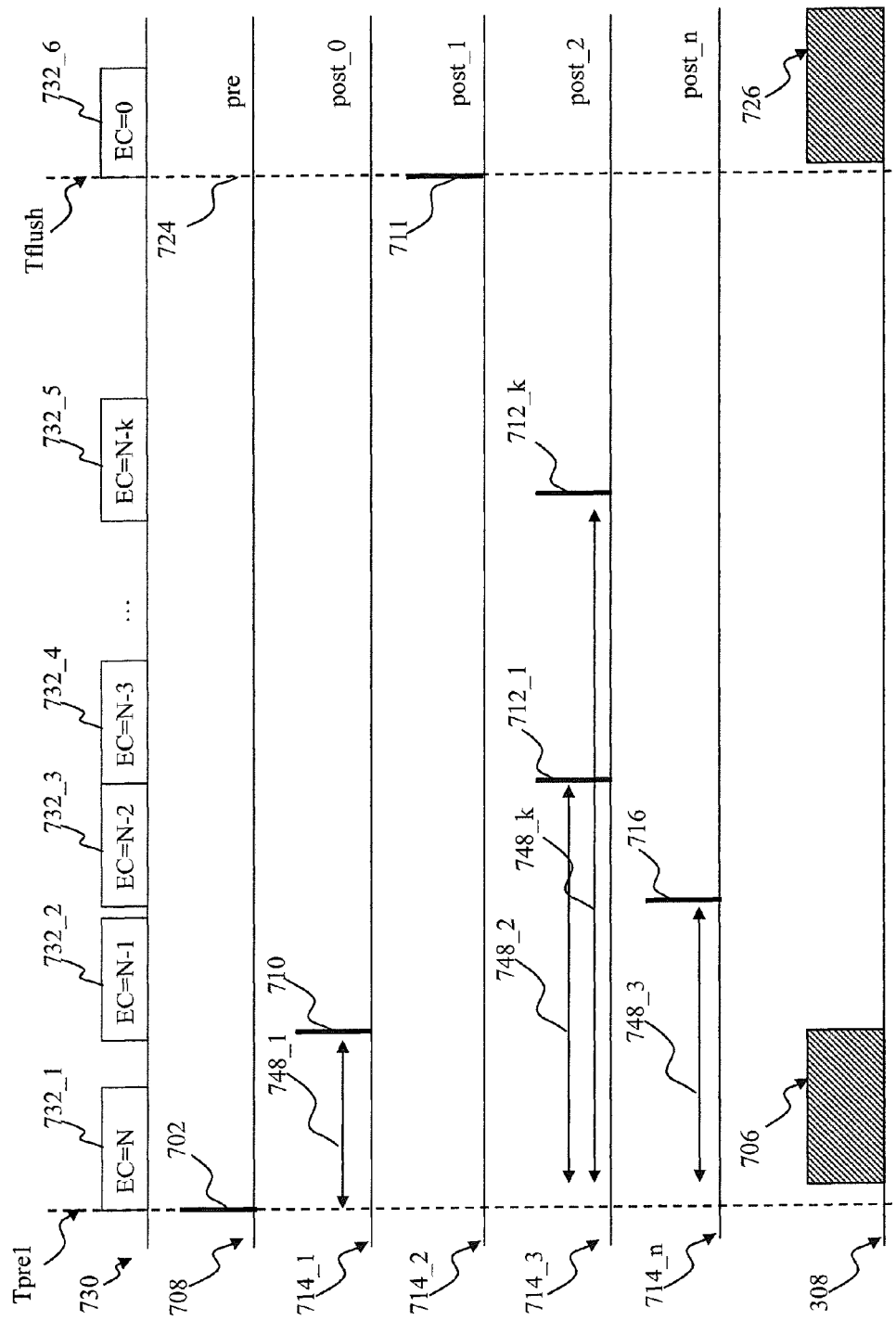
FIG. 7A is a graphical illustration depicting one embodiment of a lazy synaptic update method of the invention, comprising a buffer overflow system event.

FIG. 7A illustrates one embodiment of synaptic memory update access sequence performed by a unit of the pulse-coded network 100 that uses system events, described with respect to FIGS. 6A and 6B. Upon the receipt of the pre-synaptic pulse 702 via the pre-synaptic channel 708, the unit (e.g., the unit 122_3) executes the update transaction 706 on the bus 308, and initializes the pulse counter 730 to an initial value N, as depicted by the block 732_1 in FIG. 7A. In one variant, such as used with the embodiment of the buffer overflow system event of FIG. 6A, the initial value N equals the buffer length 606. Other implementations are compatible with the invention, such as a counter value corresponding to a predetermined time period, etc.

When subsequent post-synaptic pulses 710, 712-1, 712-k, 716 are generated by one or more units 122_2, . . . 122_k, no synaptic updates are performed (as indicated by the absence of activity on the bus 308). Instead, the post-synaptic pulse times are recorded in the pulse buffer (such as the buffer 618 of FIG. 6A) and the pulse counter 730 is decremented as indicated by the blocks 732_2 through 732_5 in FIG. 7A. When the pulse counter reaches zero (in response to the post-synaptic pulse 711) as indicated by the block 732-6, system event 724 is generated, and the synaptic update transaction 726 is performed. In one variant, the system event 724 comprises the buffer overflow event 634, while, in another variant, the system event 724 comprises the system flush event 664, described with respect to FIGS. 6A-6B, supra.

In the embodiment of FIG. 7A, the timing of the system event 724 corresponds to the $T_{flush}$ and it is used as the reference in computing STDP window, such that all the post-synaptic time intervals, denoted by the arrows 748 are taken into account for the pre-post STDP calculation. The time $T_{flush}$ is useful when the next pre-synaptic pulse is generated by the network (not shown in FIG. 7A), and the post-synaptic pulses that happened after $T_{flush}$ are taken into account for pre-post STDP calculations.

In one variant, each unit comprises a fixed-size buffer configured to store post-synaptic pulse history (firing bits), thereby enabling individual units to generate system events independently from one another.

Figure 7B:
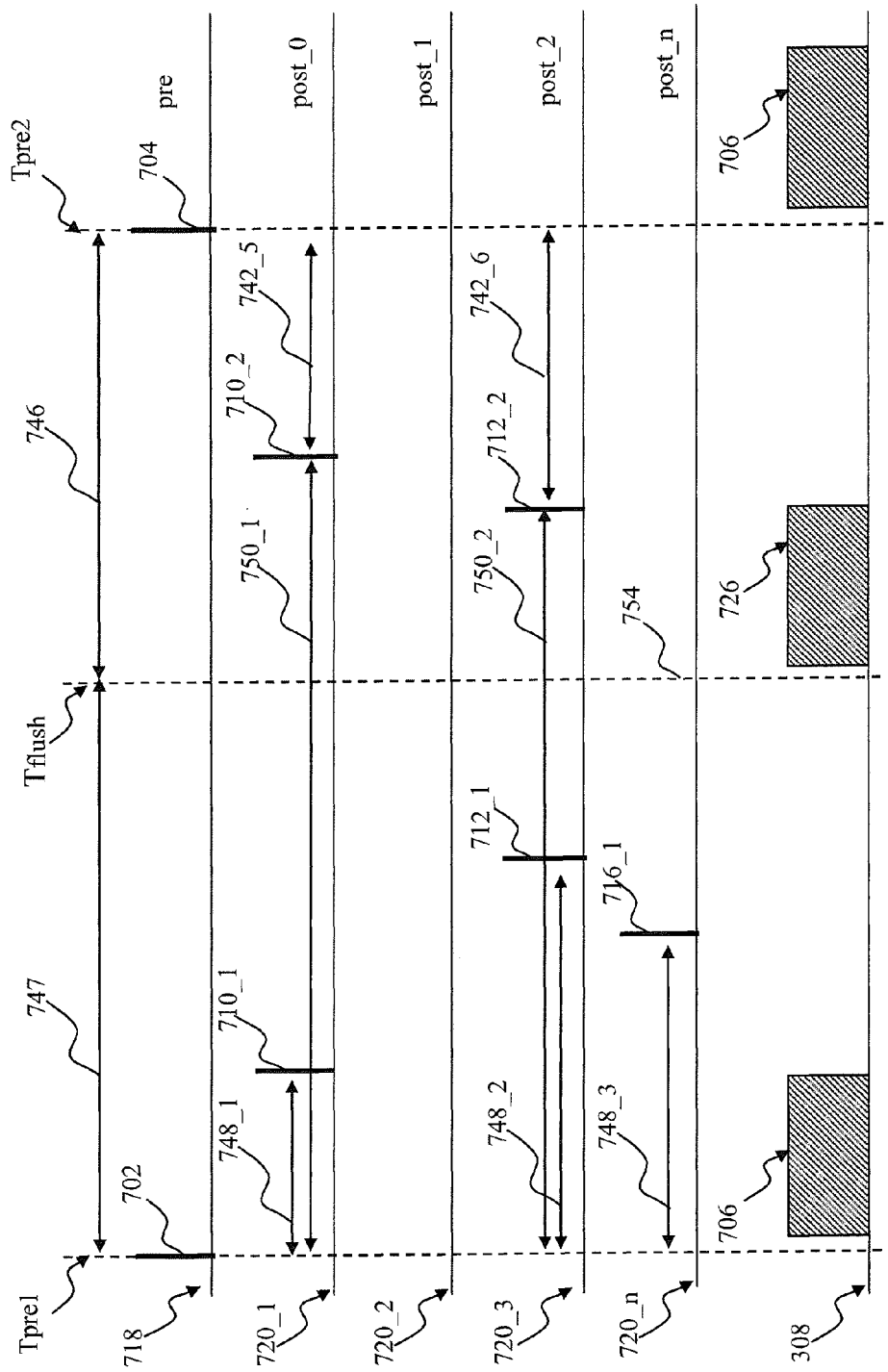
FIG. 7B is a graphical illustration depicting one embodiment of a lazy synaptic update method of the invention, comprising a flush system event.

In another embodiment, the synaptic update 726, initiated by the system event 754 in FIG. 7B, is used in conjunction with the pre-synaptic pulse-based updates 706. In one variant, the system event 754 is the flush event 664. In another variant, the system event 754 is the buffer overflow event 634. In yet another variant (such as shown in FIG. 7B), the system event 754 is not generated immediately in response to a post-synaptic pulse, but is instead produced by a variety of applicable mechanisms, such as, for example, an expiration of a timer.

The timing of the system event 754 in embodiment of FIG. 7B ensures that all the post-synaptic pulses (i.e., the pulses 710_1, 712_1, 716_1) that occurred within the time-window 747 (between the pre-synaptic pulse 702 and the flush event 754) are taken into account during the pre-post STDP updates corresponding to the flush event 754, indicated by the bus transaction 726. Similarly, when the subsequent synaptic pulse 704 occurs at the time $T_{pre2}$, only the post-synaptic pulses (i.e., the pulses 710_2, 712_2) that have occurred after the flush event 754 need to be taken into account for calculating the pre-post STDP updates indicated by the bus transaction 706_2. For a typical implementation of the flush event, the time difference between $T_{flush}$ and $T_{pre}$ is chosen to be equal to the STDP window 214, so that any post-synaptic spike that occurs after $T_{flush}$ falls outside the STDP window ($T_{post}-T_{pre}$>214 of FIG. 2A). Such configuration ensures that as it will not change the synaptic variable changes due to the pulses 710_2, 750_2 are negligible (as illustrated in FIG. 2A) and, therefore, eliminates the need for applying the pre-post STDP rule to these pulses.

Whenever a flush system event 754 is generated, then the pre-post synaptic updates (corresponding to the time windows) 748 are applied for all post-synaptic pulses 710, 712, 716 that are generated within the time window 747 (that is computed as $T_{flush}-T_{pre1}$) in FIG. 7B. The post-pre updates for the post-synaptic pulses 710, 712, 716 depends upon the type of synaptic plasticity rule that is employed. In case of nearest neighbor based STDP rule, only the first spike after the previous pre-pulse and the last spike before the next pre-pulse need to be accounted.

When the next pre-synaptic pulse 704 is received, synaptic variables update only needs to account for the post-synaptic pulses generated within the time window 746 since the last flush event 754. Hence, the pre-post STDP is evaluated for the post-spikes 710_2, 712_2 using the time differences 750_1, 750_2 with respect to the pre-pulse 702 occurring at $T_{pre}$. The post-pre STDP rule is applied for the pulses occurring at 710_2, 712_2 using the time differences 742_5, 742_6 with respect to the current pre-pulse 704 occurring at $T_{pre2}$. This approach is applicable to nearest-neighbor based STDP update rule. Thus, each post-synaptic pulse (e.g. 710_1, 710_2, 712_1, 712_2) will not cause any memory transaction in the synaptic bus for updating the incoming synaptic variables. Only the spike history is updated for every post-synaptic pulse as illustrated in the flowchart 6C. For other types of STDP rules, a trace-based mechanism described in the next para is necessary to account for the post-pre STDP rule due to the post-synaptic pulses 712_1, 716_1 and the current pre-pulse 704.

For other kinds of plasticity rules where every post-synaptic pulse needs to be accounted for in the STDP calculations, a post-synaptic trace-based mechanism is used. In spiking neural networks, each post-synaptic node can contain an internal trace variable that is updated with each postsynaptic spike by certain amount, and decays between spikes with a fixed time constant based on the synaptic plasticity rule. This internal trace variable stored in the post-synaptic unit can be used by each synapses to calculate the overall change in the synaptic variable before actual delivery.

Figure 7C:
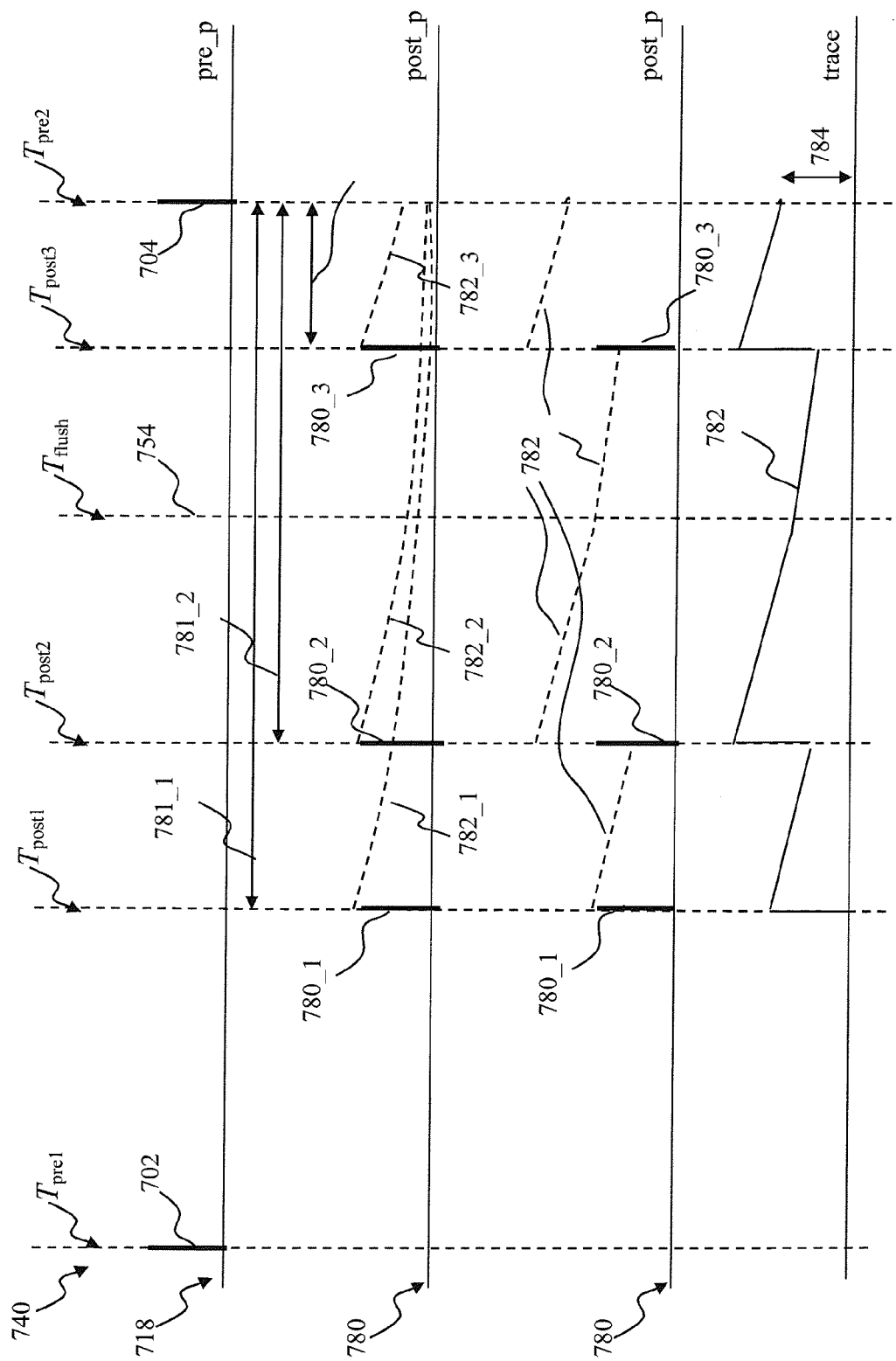
FIG. 7C is a block diagram illustrating one embodiment of lazy synaptic update method of the invention comprising trace variables and a flush system event.

One exemplary embodiment of the trace-based post-synaptic mechanism, which accounts for the post-synaptic pulses flushed based on a system event, is illustrated in FIG. 7C. The pre-post STDP rule evaluation mechanism being used with the flush events is described supra. When the next pre-synaptic pulse 704 is received at time $T_{pre2}$ in FIG. 7C, all of the post-pre time intervals 781_1, 781_2, 781_3 need to be accounted for during the post-pre synaptic update that is based on the post-synaptic pulses 780_1, 780_2, 780_3. When the pulse 704 occurs before the flush event ($T_{pre2}<T_{flush}$), the timing (spiking history) of the pulses (e.g. the pulse 780_1) is known. However, in the embodiment illustrated in FIG. 7C, the flush event $T_{flush}$ causes flushing (i.e., removal) of the spike timing history associated with some of the post-synaptic pulses (e.g. the pulses 780_1, 780_2). As a result, the plasticity rules corresponding to the removed pulses (e.g., the rules depicted by the traces denoted as 782_1, 782_2 in FIG. 7C) cannot be evaluated when the subsequent post-synaptic pulse (e.g., the pulse 704) is received by the post-synaptic node. In order to obtain accurate channel update (that utilizes the STDP updates of flushed pulses 780_1, 780_2), embodiment of FIG. 7C employs an additional storage in post-synaptic unit (referred to as the trace) that stores information related to the cumulative effect of all flushed post-synaptic pulse (e.g., the trace information denoted by 782_1, 782_2). The stored trace data enables evaluation of the respective post-pre STDP rules when the pre-synaptic pulse 704 is received at time $T_{pre2}$. By way of example, the trace variable 782 in FIG. 7C keeps track of the combined effect of post-pre STDP updates contributed by each post-synaptic pulse 780_1, 780_2, 7803, as depicted by the curves 782_1, 782_2, 782_3, respectively. When the next pre-synaptic pulse is received at $T_{pre2}$, the post-synaptic node reads the trace variable to obtain the cumulative post-pre STDP adjustment (denoted by the arrow 784 in FIG. 7C) due to previously flushed pulses 780_1, 780_2, 780_3, respectively.

In another embodiment of the system event-based synaptic update method (not shown), only the time difference ($\Delta t = T_{post} - T_{pre}$) between the last pre-synaptic pulse (e.g., the pulse 702 in FIG. 7B) and the next post-synaptic pulse (e.g., the pulse 710_1 in FIG. 7B) is stored for each synapse (e.g., the time 748_1) when the flush system event is triggered. This approach uses a short read/write pair for storing the time difference on each synapses, and postpones the actual update of the synaptic variables until the next pre-synaptic spikes. This mechanism only works for certain class of synaptic updates, termed nearest-neighbor STDP rule (see Izhikevich E. M. and Desai N. S. (2003), incorporated by reference supra). For example, when the system event $T_{flush}$ is generated at 754, the time difference between the pre-pulse 702 and all post-pulses (710_1, 712_1, 716_1) are stored in the synaptic memory by a memory transaction smaller than 726. This time difference is sufficient to update the synaptic variables when the next pre-pulse 704 is generated.

In another embodiment, successive flush-events are generated for every $N_{fire}$ post-synaptic pulses. Such update mechanism is especially useful with synaptic plasticity rules that adjust synaptic variables for every post-synaptic pulse. One specific example of such plasticity rule is shown in FIG. 2B (the bump-STDP), where the adjustment amplitude 228 remains finite even as $\Delta t = T_{pre} - T_{post}$ grows larger. Because the 'long tail' plasticity rules (such as shown in of FIG. 2B) cause measurable synaptic weight increase or decrease for every post-synaptic pulse, any synaptic pulse history loss will adversely affect spiking network operation. In order to prevent history loss when using the lazy-update methods in conjunction with the long-tail plasticity rules (such as FIG. 2B), periodic flush system event are generated for every $N_{fire}$ post-synaptic pulses.

In another approach, generation of flush system events is stopped after a certain number Nstop of post-synaptic pulses, when additional post synaptic pulses do not significantly affect data propagation accuracy within the network. For example, the plasticity rules, such as illustrated in FIG. 2A, cause infinitesimal synaptic weight adjustments when the time interval $\Delta t$ extends beyond the time windows denoted by the arrows 214, 214 in FIG. 2A. As a result, the post synaptic pulses generated outside these windows 212, 214 may not be accounted for, and the generation of flush system events can be conveniently stopped. The precise stopping point is dependent upon the exact shape and width of the plasticity curves 202, 206 and unit post-synaptic pulse generation frequency.

In a different approach, the actual mechanism of flush system event generation is determined at run-time of the network apparatus (such as the apparatus 300) based on various parameters, which are determined by the application by the application developer. In one variant, these parameters comprise the width of the plasticity window, and/or network error tolerance. In another variant, the flush events are generated using a stochastic model, where some loss of accuracy of the network performance is traded for simplicity of the network apparatus. These mechanisms form a category of techniques that reduces the overall number and frequency of flush system events without deteriorating the accuracy or performance of the simulation.

Figure 8:
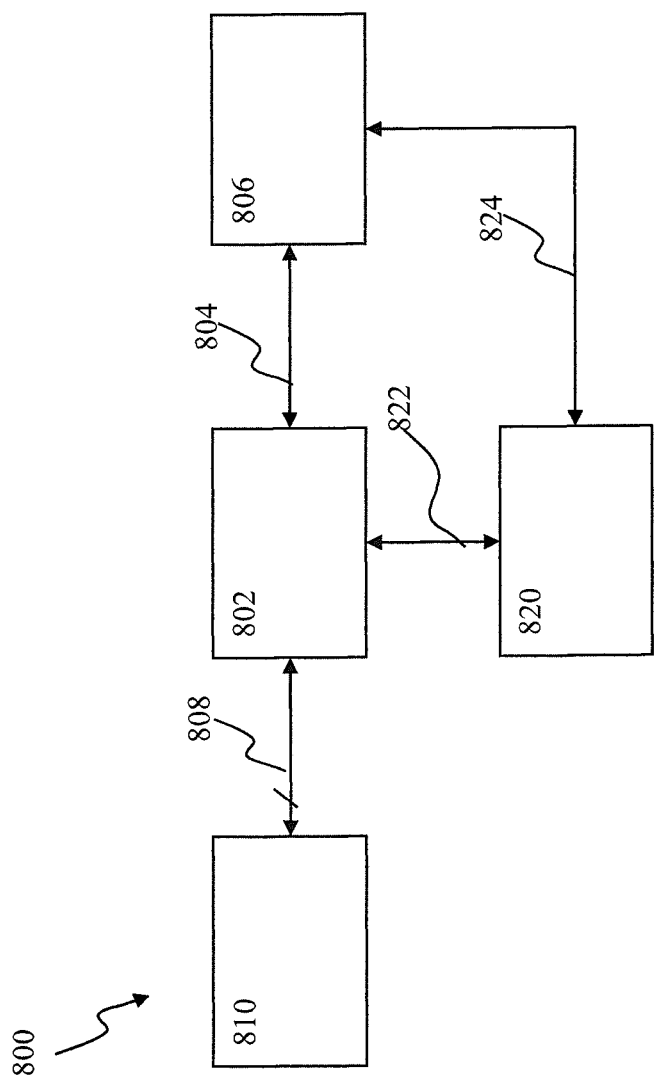
FIG. 8 is a block diagram illustrating one embodiment of a neuro-synaptic execution network apparatus comprising shared heap memory according to the invention.
Figure 8A:
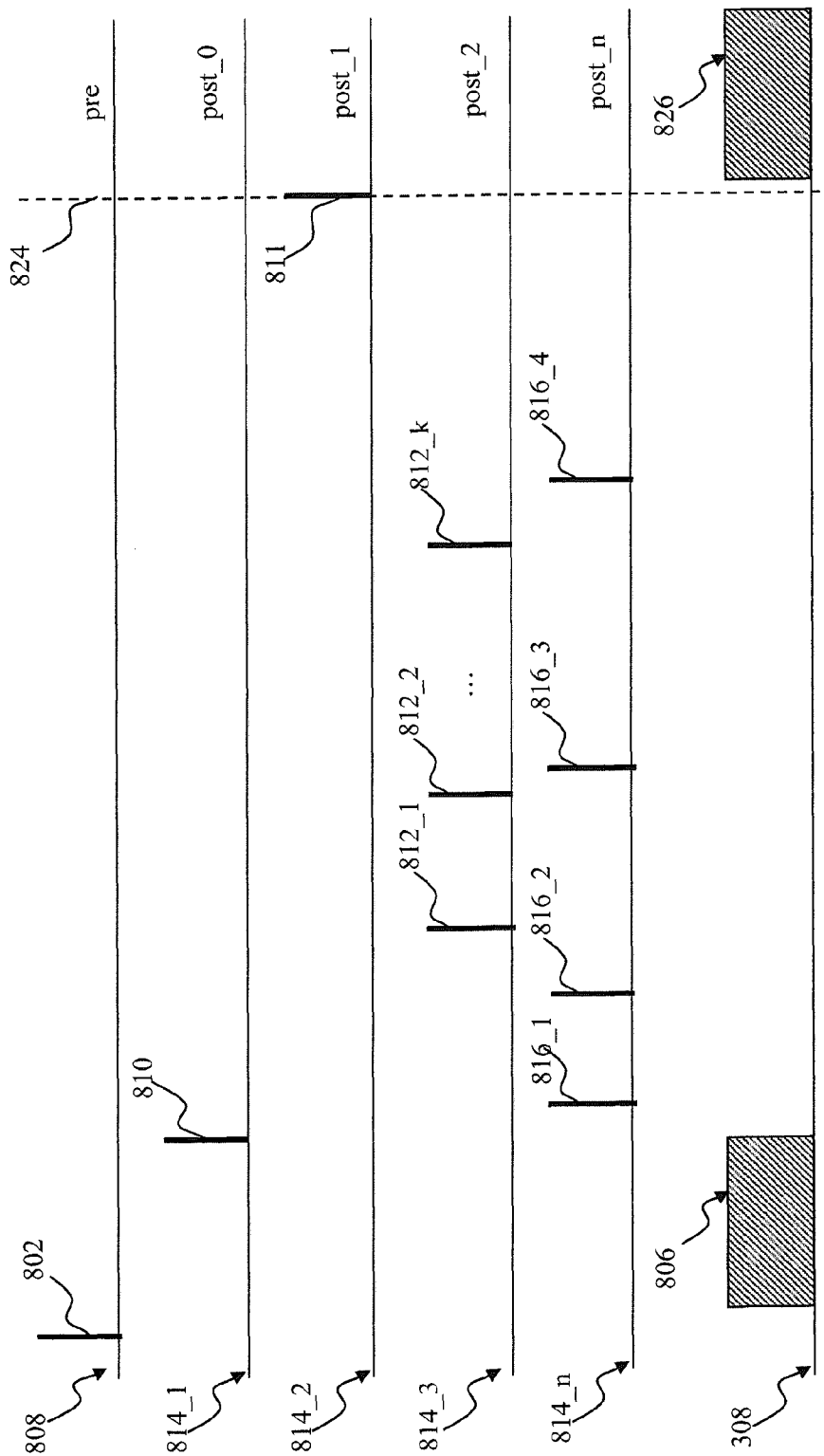
FIG. 8A is a graphical illustration depicting one embodiment of lazy synaptic update method of the invention useful with the shared heap memory network apparatus of FIG. 8.

Referring now to FIG. 8, one embodiment of apparatus configured for storing post-synaptic unit pulse history, comprising shared heap memory architecture, is shown and described in detail. The architecture 800 comprises synaptic computation block 802 in communication with the synaptic memory 810 over the synaptic bus 808 and the neuronal computations block 806 over the neuronal bus 804. A shared pulse heap memory block 820 is coupled to the synaptic and the neuronal computations blocks 802, 806 via the buses 822, 824, respectively.

The shared memory block is accessible and shared by a number of post-synaptic units (such as the units 122 in FIG. 1A), which store their individual histories of the post-synaptic pulse generation (firing). This shared-memory mechanism allows high-firing units (such as the units corresponding to the channels 814-3, 814-n in FIG. 8B) to share memory buffer or heap space with low-firing units (such as the units corresponding to the channels 814_1, 814_2 in FIG. 8B), thereby reducing generation frequency of system events.

The embodiment of FIG. 8B generates a buffer overflow event only when the post-synaptic timing data for the pulse 811 cannot be accommodated by the shared buffer 820. Whenever the overflow event 824 is generated, the post-synaptic pulse STDP adjustment is performed by calculating the new synaptic variables, starting from the oldest un-updated post-synaptic pulse (such as the most recent spike). Sharing the common heap buffer allows high-firing units to use memory allocations of low-firing units, thereby reducing the number (and frequency) of flush events.

Partitioned Network Apparatus

Typically, the following synaptic computations are performed for each post-synaptic unit receiving a pre-synaptic pulse:

(a) read synaptic variables and connection information (post neuron ID and delay etc.) for the unit from the synaptic memory;
(b) read the post-synaptic pulse timing and post-synaptic neuronal variables (e.g. post-synaptic current) from the neuronal memory;
(c) update the neuronal variables based on the connection information;
(d) update the synaptic variables (including synaptic weights) based on the post synaptic pulse timing; and
(e) store the updated synaptic variables to the synaptic memory.

The lazy synaptic update mechanism, described supra, results in efficient access of the synaptic memory block 310, and improves the steps (a), (d) and (e) above. A network comprising a large number of units and connections, requires a large number of post-synaptic neuron updates for every pre-synaptic pulse (steps (b) and (c) above). The update approach of the invention described below, advantageously improves performance of steps (b) and (c) by providing an efficient access mechanism for the neuronal state information (post-synaptic neuron timing and post-synaptic neuronal variables).

Figure 9:
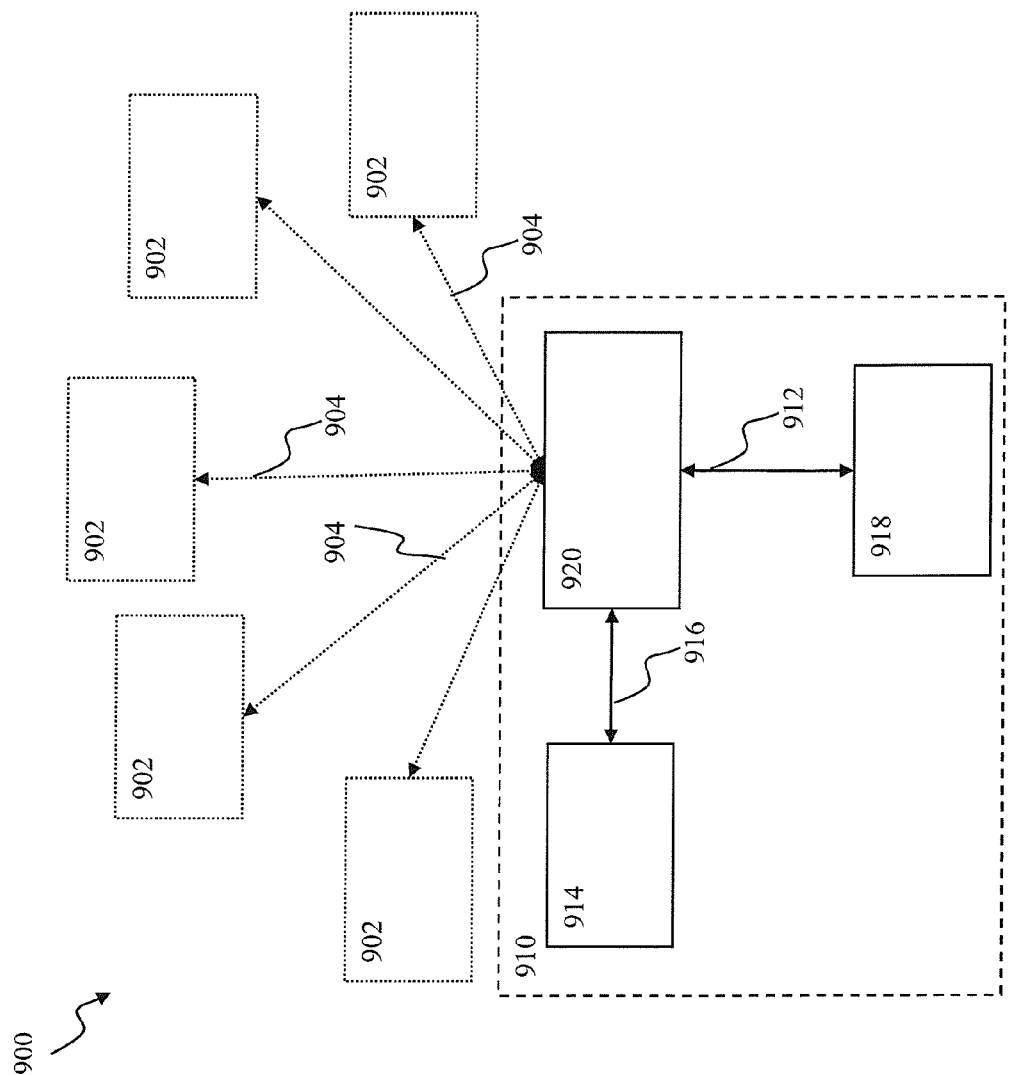
FIG. 9 is a block diagram illustrating one embodiment of multi-partition artificial neuro-synaptic network architecture according to the invention.

FIGS. 9-9A illustrate one embodiment of a partitioned network architecture 900 and a network apparatus 910 useful for implementing large spiking neural networks on a hardware platform that has limited on-chip memory (that is, the memory that is available within the same integrated circuit or IC die which hosts the synaptic processing block and the neural processing block). The network 900 of FIG. 9 comprises a large number (typically between $10^3$ and $10^7$) of units (such as the units 102, 122, 132 of FIG. 1A), and even larger number (typically between $10^6$ and $10^{10}$) of synaptic connections (such as the connections 108, 114 in FIG. 1A). In order to enable data processing for such a large number of network entities by a processing apparatus 910 (units, synaptic connections), the network 900 is partitioned into multiple smaller network blocks 902, referred to as the network partitions. Each partition 902 is communicatively coupled to the network processing apparatus 910.

In an exemplary non-partitioned network, every unit stores a single connectivity table that describes all of the unit connections within the network (e.g., connections 114 in FIG. 1A). In a partitioned network, (such as the network 900 of FIG. 9) any unit in the network can be connected to multiple units that are spread across different network partitions 902. Therefore, the unit connectivity table is split into multiple sub-tables so that each unit can address the units belong to every partition separately and, therefore, to perform the synaptic computations for one partition at a time. These computations comprise the following steps:

(a) load connection information for all units within the partition;

(b) load the neuronal state (pulse timing and internal state) for the units within the partition from the global memory;

(c) perform synaptic computations for all pre-synaptic pulses generated by the network and update the neuronal states of the units; and (d) store the post-synaptic neuronal states of partition units back to the global memory, and proceed with the next partition to step (a).

Thus, at any point of execution, the on-chip memory that stores the neuronal state information, needs to store only a small subset (N/P) of the entire network neuronal state, where N is the total number of units, and P is the total number of partitions.

One particular embodiment of the network processing apparatus 910 is shown and described with respect to FIG. 9A herein. The network apparatus 910 comprises a synaptic block 920, synaptic memory 918, and neuronal block 914.

The synaptic block comprises multiple synaptic computations instances 922 that evaluate the synaptic computation for many synapses in parallel. Although only three instances 922 are shown in FIG. 9A, it will be appreciated by those skilled in the arts that the number of instances is determined by the specific implementation. In one variant, each instance 922 is implemented as a separate software thread or a process, with multiple threads executed by the same processing device, such as an FPGA or a multi-core CPU. In another variant, each instance 922 is executed by a dedicated processing logic or unit (such as e.g., gate logic, FPGA, processor, or a processor core). In another variant, each instance comprises an FPGA slice, etc.

The synaptic computation block comprises a partition memory cache 924 is shared by multiple instances 922 as shown in FIG. 9A. In one variant, the partition memory cache 924 comprises the heap buffer 820, described with respect to FIG. 8 supra. The synaptic connectivity also needs to be segmented to address each partition separately.

The synaptic computation block is coupled to the synaptic memory 918 via the synaptic memory bus 912, and to the neuronal block via the bus 916. The neuronal block 914 comprises a neuronal processing unit 926 and neuronal memory 928, which stores information related to the units (within the network 900), such as the spike timing, unit internal state, etc.

In the embodiment of FIG. 9A, the synaptic block 920 is implemented on a single chip (IC), as denoted by the broken line rectangle marked with the arrow 932.

Figure 9B:
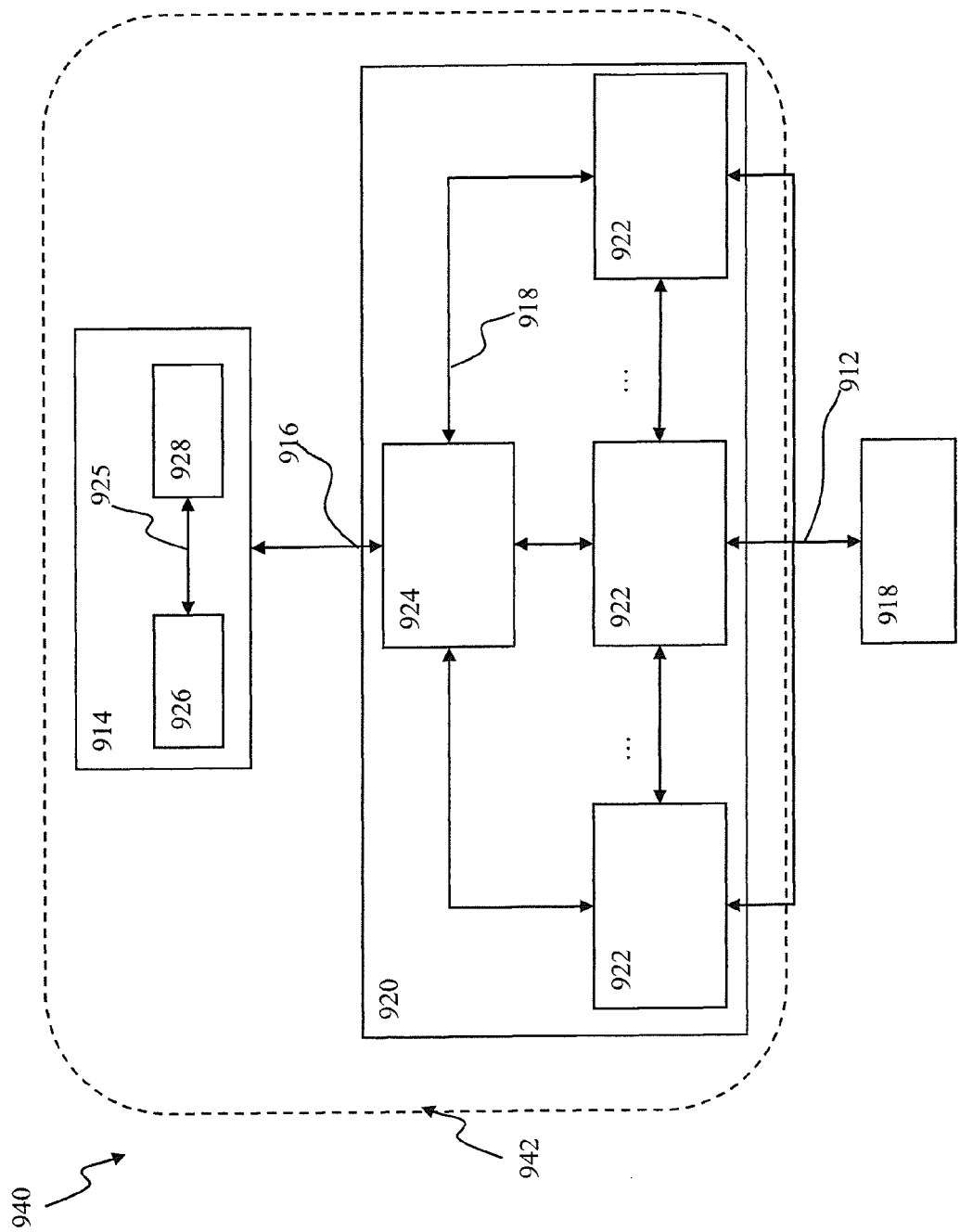
FIG. 9B is a block diagram illustrating a second embodiment of computerized neuro-synaptic execution apparatus for implementing the multi-partition network of FIG. 9.

In another embodiment (shown in FIG. 9B), the network processing apparatus 940 comprises the synaptic block 920 and the neural block 914 implemented on the same dye (IC) chip, as denoted by the broken line rectangle marked with the arrow 942 in FIG. 9B.

Figure 9C:
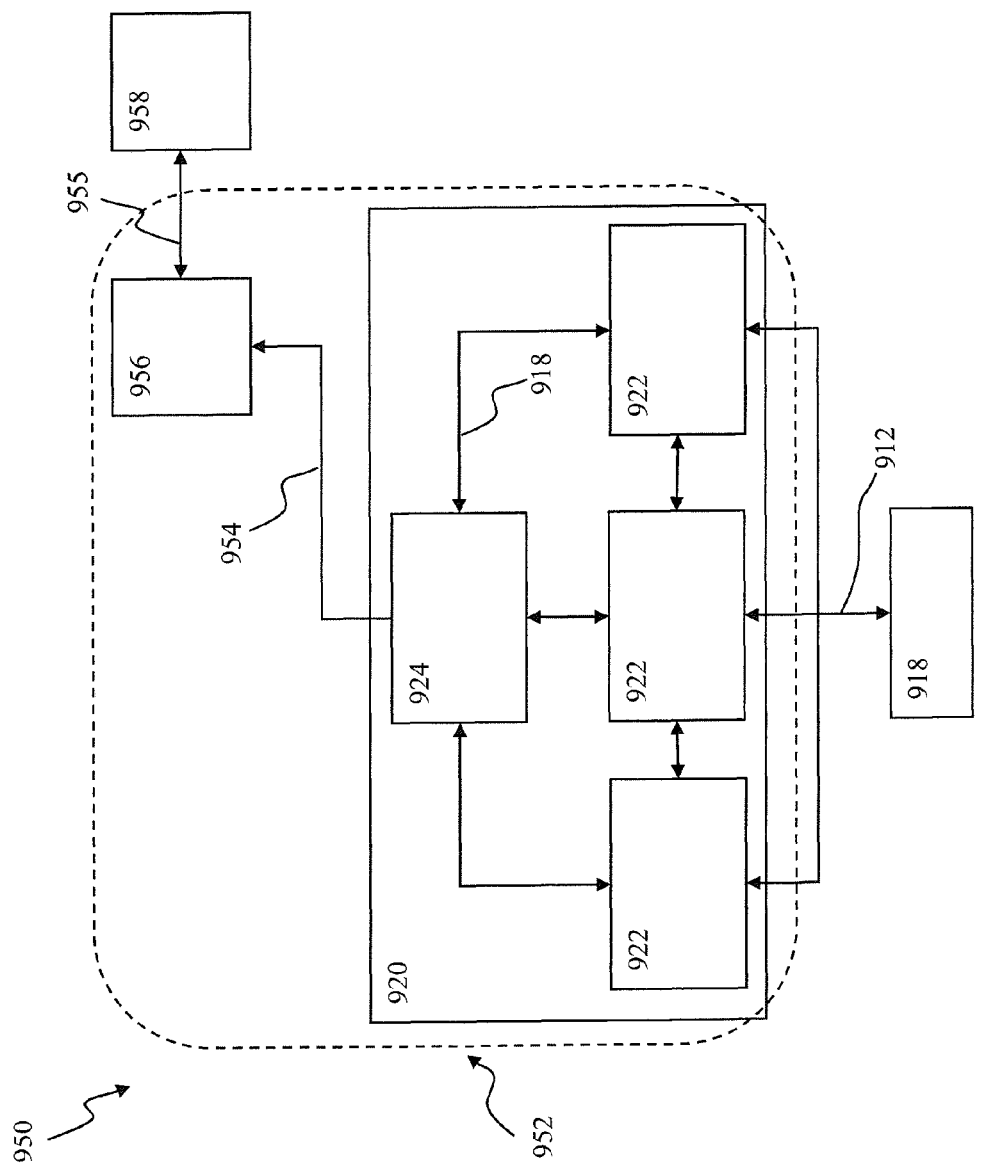
FIG. 9C is a block diagram illustrating a third embodiment of computerized neuro-synaptic execution apparatus for implementing the multi-partition network of FIG. 9.

In a different embodiment shown in FIG. 9C, the network processing apparatus 950 comprises the synaptic block 920 and the neuronal processing unit 956 which are implemented on the same dye (IC) chip, as denoted by the broken line rectangle marked with the arrow 952 in FIG. 9B. The neuronal processing unit 956 is coupled to the partition memory cache 924 via the bus 954 and is coupled to the off-chip neuronal memory 958 via the bus 955.

It will be appreciated that the embodiments shown in FIGS. 9A-9C serve to illustrate the principles of the invention, and myriad other network processing apparatus implementations may be used with the partitioned network 900, such other implementations being readily identified by those of ordinary skill in the relevant arts given the present disclosure.

During operation of the exemplary network 900, each partition data (comprising the neuronal data for that partition) is stored in the shared memory cache 924 directly or by caching mechanism, and updated one after another. The entire state resides in the off-chip global state memory 300. The connection table is also broken into P connection sub-tables, where each sub-table stores all the incoming connections for one particular partition. The network synaptic update computations are performed one partition at a time in a predetermined partition sequence. During synaptic update phase, the synaptic variables are streamed via the bus 912 to/from the synaptic memory 918, and various post-synaptic updates are concurrently applied to the data within the partition buffer or cache 924. That is, each synaptic computation block 922 reads the synaptic variables associated with a given pre-synaptic pulse from the synaptic memory 918, examines the pulse timing of the post-synaptic neuronal state stored in the local partition cache 924, calculates new synaptic variables (including the synaptic weights), updates the post-synaptic neuronal state using the updated synaptic variables, and stores the modified synaptic variables (including the synaptic weight) back in the synaptic memory 918.

Having smaller partition size (e.g., fewer units within each partition 902) reduces the on-chip memory 924 requirements but increases the number of partitions. Furthermore, if the number of post-synaptic units within a partition small, than each pre-synaptic pulse will require an update of only a small subset of the post-synaptic neuronal states for the partition. As a result, the amount of data streamed through the memory bus 912 is reduced when smaller partitions are used, resulting in a less efficient usage of the memory bus 912 due to increased overhead associated with the multiple memory transactions (such as the overhead block 436 in FIG. 4A, described supra).

Larger partitions, comprising more units, require larger on-chip memory 924 in order to store the synaptic connection data for the units. Hence, a trade-off exists between the number of partitions, efficient usage of the streaming synaptic memory bandwidth, and the size of the simulated network.

When a pre-synaptic neuron fires, the generated pre-synaptic pulse may affect a large number (depending on a specific network topology) of post-synaptic neurons. As discussed above with respect to synaptic variables updates, in a pre-synaptically indexed memory model, access to post-synaptically indexed units is inefficient. Thus each pre-pulse will result in multiple accesses of the neuronal memory while updating the post-synaptic neuronal states. Such fragmented access results result in an inefficient utilization of memory bus bandwidth. By way of example, consider one variant of network processing apparatus (such as the apparatus 910) which implements neuronal bus 916 having the minimum transaction size of 16 words. That is, 16 sequential neuron unit data items (comprising, for example, the unit state, recent firing time, and firing history) are retrieved/stored from/to a given memory address range in a single transaction. Consider that the neuronal updates are applied to memory locations at <40>, <4000>, . . . , <52>, <4010>, <5000>, and so on. By ordering (sorted) the memory requests as {<40>, <52>, <4000>, <4010>, <5000>} the total number of memory transactions on the neuronal bus 916 is reduced, because multiple neuronal states can be simultaneously read or stored within one transaction. In the above example, the data at addresses <40> and <52>, <4000> and <4010> are accessed within a single bus-transaction, thereby reducing the number of bus 916 transactions (and hence the bus overhead) and improving bus utilization. Note that the above grouping of memory transactions increases bus use efficiency, provided that the adjacent addresses are within the minimum transaction size address range (16 words in the above example).

Figure 3B:
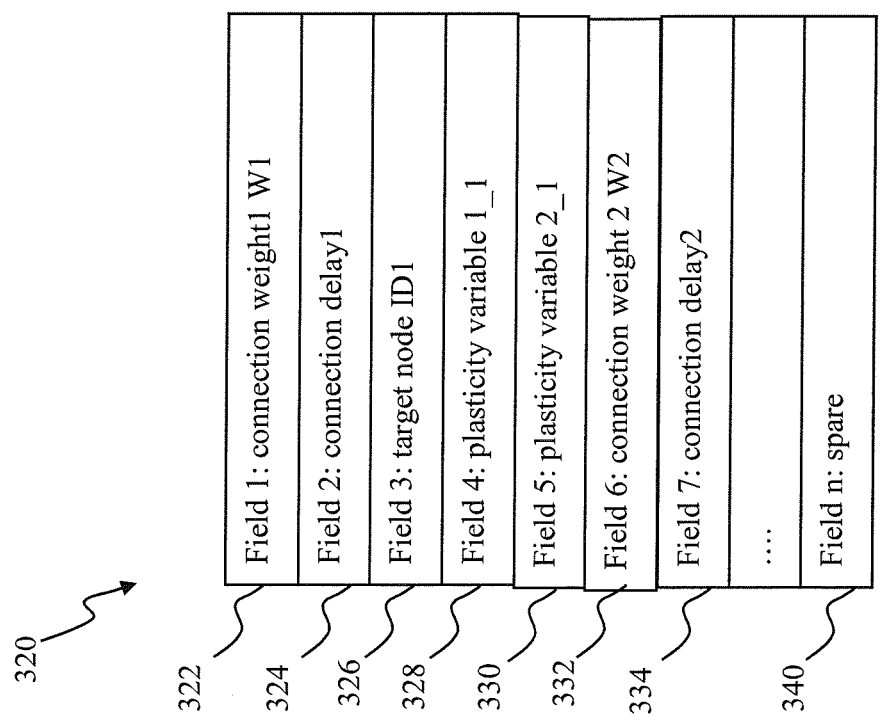
FIG. 3B is a block diagram illustrating one embodiment of a synaptic element structure for use with the network apparatus of FIG. 3.
Figure 3C:
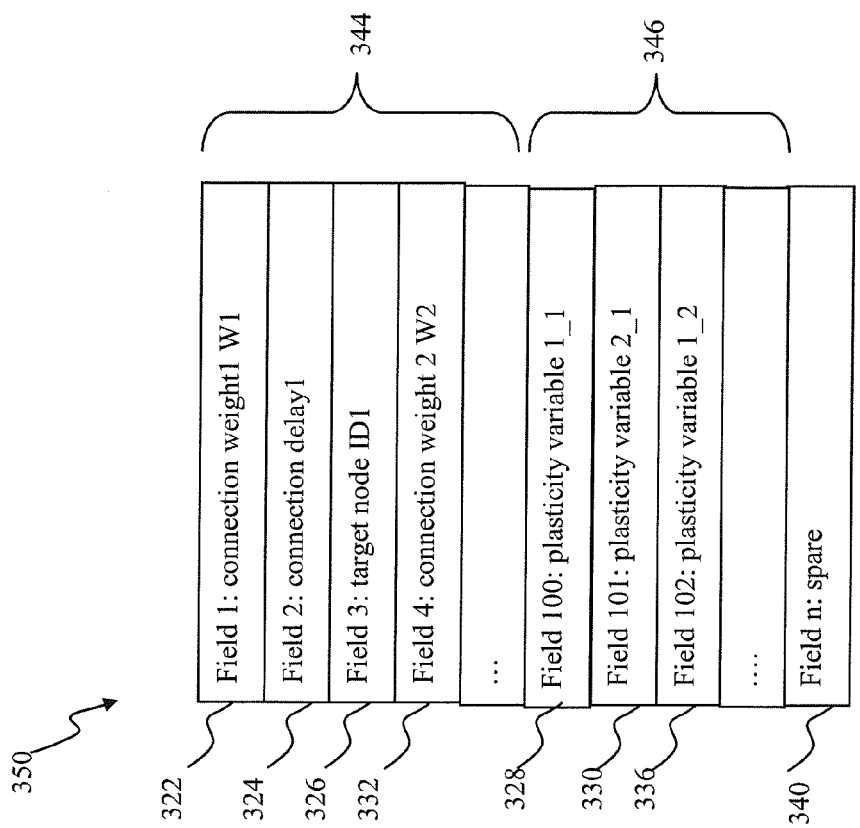
FIG. 3C is a block diagram illustrating another embodiment of a synaptic element structure for use with the network apparatus of FIG. 3.

For reordering the memory transaction, the synaptic connections for the given pre-synaptic neuron can be rearranged based on the memory-addresses of the post-synaptic neuronal address (as indicated, for example, by the target unit ID 326 in FIG. 3B). If the post-synaptic connections are sorted based on the memory addresses of the neuronal ID or address, then multiple neuronal states can potentially be retrieved within a single memory transaction (such as, the transaction 406_1 in FIG. 4). This mechanism can potentially reduce the number of neuronal memory transaction in comparison to random addressing of the post-synaptic unit ID. This reordering mechanism improves memory locality of the successive transactions, and benefits from various caching techniques. It essentially means that if the memory request on the bus 306 is cached, than the reordered neuronal memory requests mechanism described above performs better than arbitrary ordered memory requests.

Exemplary Uses and Applications of Certain Aspects of the Invention

Apparatus and methods for implementing lazy up-to-date synaptic update in a pulse-coded network offer mechanisms that substantially improve synaptic memory access efficiency compared to the previously used un-coalesced memory transactions. This improved memory access can advantageously be used to process a larger number of synaptic connections (for the same bus throughput) or to realize pulse coded networks using a less costly memory bus implementations (i.e., a lower speed and/or a smaller bus width).

Furthermore, the synaptic memory update mechanism that is based on the pre-synaptic pulse generation/receipt provides an up-to-date synaptic connection information and, therefore, improves network accuracy.

The mechanism described in this invention can be utilized to implement many different types of synaptic plasticity models described in literature (see Izhikevich E. M. and Desai N. S. (2003), incorporated herein supra.

The approach and mechanism described in this invention is applicable to various hardware platform including Graphics Processors, Field Programmable Gate Arrays, and dedicated ASICs.

Moreover, the use of system events further improves timeliness of synaptic updates and allows for a simpler network implementation with reduce unit memory size.

As previously noted, methods for efficient synaptic variable update that implement lazy update scheme, described with respect to FIGS. 5A through 7A herein, advantageously reduce synaptic bus overhead. In one variant, this improvement allows for processing of larger unit populations for the same bus bandwidth (such as bus speed and/or width), compared with the existing update techniques. This improvement allows for simpler network processing apparatus implementation (such as the apparatus 910 of FIG. 9A) which utilize a lower bandwidth bus access. Simpler bus architecture (due to a slower and/or smaller width bus), in turn, reduces network processing apparatus cost and improves reliability.

Advantageously, exemplary embodiments of the present invention can be built into any type of spiking neural network model that are useful in a variety of devices including without limitation prosthetic devices, autonomous and robotic apparatus, and other electromechanical devices requiring objet recognition functionality. Examples of such robotic devises are manufacturing robots (e.g., automotive), military, medical (e.g. processing of microscopy, x-ray, ultrasonography, tomography). Examples of autonomous vehicles include rovers, unmanned air vehicles, underwater vehicles, smart appliances (e.g. ROOMBA®), etc.

Embodiments of the present invention are further applicable to a wide assortment of applications including computer human interaction (e.g., recognition of gestures, voice, posture, face, etc.), controlling processes (e.g., an industrial robot, autonomous and other vehicles), augmented reality applications, organization of information (e.g., for indexing databases of images and image sequences), access control (e.g., opening a door based on a gesture, opening an access way based on detection of an authorized person), detecting events (e.g., for visual surveillance or people or animal counting, tracking), data input, financial transactions (payment processing based on recognition of a person or a special payment symbol) and many others.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of operating a communications channel coupled to a post-synaptic unit in a computerized spiking neuronal network, the method comprising:
   modifying the communications channel based on a first group of pulses associated with the post-synaptic unit, the first group of pulses occurring between a preceding trigger communicated via the communications channel and a system event;

maintaining the communications channel substantially unmodified between the system event and the preceding trigger; and storing, in a shared memory block of a storage apparatus, information related to the first group of pulses and a second group of pulses, the second group of pulses being associated with one other post-synaptic unit.

2. The method of claim 1, wherein the system event is generated by a network entity in data communication with the post-synaptic unit and is based at least in part on a portion of the information being stored in the shared memory block, the portion of the information being related to at least one pulse of the first group of pulses.

3. The method of claim 2, wherein the system event is useful for removal of at least the portion from the shared memory block.

4. The method of claim 1, wherein the system event is generated based at least in part on a size of the shared memory block.

5. The method of claim 1, wherein:
the system event comprises a current trigger being communicated via the communications channel; and
the modifying the communications channel comprises determining an updated channel weight based at least in part on the preceding trigger, the system event, and at least a portion of the first group of pulses.

6. The method of claim 5, wherein:
the system event is generated by a network entity in data communication with the post-synaptic unit and is based at least in part on a first portion of the information being stored in the shared memory block, the first portion of the information being related to at least one pulse of the first group of pulses; and
the system event is useful for removal of at least the first portion of the information from the shared memory block.

7. The method of claim 6, further comprising modifying a state of the post-synaptic unit based at least in part on the updated channel weight.

8. The method of claim 5, wherein the determining the updated channel weight comprises:
performing a plurality of first updates based at least on a first plurality of intervals between the preceding trigger and generation time of a given pulse within the portion; and
performing a second update based at least on a second interval between the preceding trigger and the system event.

9. An apparatus configured to operate a communications channel coupled to a post-synaptic unit in a computerized spiking neuronal network, the apparatus comprising:
means for modifying the communications channel based on a first group of pulses associated with the post-synaptic unit, the first group of pulses occurring between a preceding trigger communicated via the communications channel and a system event;
means for maintaining the communications channel substantially unmodified between the system event and the preceding trigger; and
means for storing information related to the first group of pulses in a shift register.

10. The apparatus of claim 9, further comprising:
means for generating the system event by a pre-synaptic unit based at least in part on an idle interval exceeding a predetermined threshold, the idle interval comprising a time elapsed from a latest pulse of the first group of pulses being generated by the post-synaptic unit; and
means for generating the preceding trigger by the pre-synaptic unit.

11. The apparatus of claim 10, wherein the system event is configured to effectuate a modification of at least one channel connected to the pre-synaptic unit, the at least one channel comprising the communications channel.

12. The apparatus of claim 11, wherein the system event is configured to maintain a state of the post-synaptic unit, the state associated with a model used in operating the post-synaptic unit.

13. A method of operating a node of a spiking network, the method comprising:
responsive to a system event, storing in a storage device a plurality of intervals between a first trigger and a plurality of pulses generated by the node; and
performing a first update of a channel based at least in part on the plurality of intervals; and
wherein the first trigger is communicated to the node via the communications channel prior to the system event.

14. The method of claim 13, wherein:
first individual ones of the plurality of pulses are being generated prior to the system event; and
second individual ones of the plurality of intervals are configured based on information related to first individual ones of the plurality of pulses.

15. The method of claim 14, wherein:
the information related to the first individual ones of the plurality of pulses is stored in a block of a shared memory, a size of the block being larger than the size of another block configured to store the intervals in the storage device; and
the system event enables removal of the information from the shared memory, thereby enabling size reduction of the shared memory.

16. The method of claim 13, further comprising:
subsequent to performing the first update, performing a second update of the communications channel based on a second interval between a second trigger and a latest pulse of the plurality of pulses generated by the node;
wherein:
the first update and the second update cooperate to determine an updated channel weight; and
the second trigger is communicated via the communications channel subsequent to the system event.

17. The method of claim 16, further comprising:
storing, in a shared block, first information related to the plurality of pulses; and
storing, in the shared block, second information related to a group of pulses being generated by one other post-synaptic unit;
wherein:
the system event enables removal of data corresponding to at least one of (i) at least a portion of the first information, and/or (ii) at least a portion of the second information, from the shared block, the removed data corresponding to a first set of pulses; and
where the first set of pulses precedes a second set of pulses for which data remains stored in the shared block.

18. The method of claim 17, further comprising modifying a state of the node based at least in part on the updated channel weight, the second update performed subsequent to the first update.

19. The method of claim 13, further comprising:
storing, in a shared block, first information related to the plurality of pulses; and
storing, in the shared block, second information related to a group of pulses being generated by one other post-synaptic unit;
wherein:
the system event enables removal of data corresponding to at least one of (i) at least a portion of the first information, and/or (ii) at least a portion of the second information, from the shared block, the removed data corresponding to a first set of pulses; and
the first set of pulses precedes a second set of pulses for which data remains stored in the shared block.

20. The method of claim 19, wherein the storage device comprises a shift-register.

21. The method of claim 13, wherein:
the system event is generated by a network entity in data communication with the node and is based at least in part on a portion of information being stored in a shared memory block of the storage device, the portion being related to at least one pulse of the plurality of pulses; and
the system event is useful for removal of at least the portion from the shared memory block.

22. The method of claim 13, wherein the system event is generated by a pre-synaptic unit based at least in part on an idle interval exceeding a predetermined threshold, the idle interval comprising a time elapsed from a latest pulse of the plurality of pulses being generated by the node.

23. The method of claim 22, wherein the storage device comprises a shift register.

24. A method of optimizing operation of a shared storage of computerized network apparatus comprising at least one node coupled to a channel, the method comprising:
storing, in the shared storage, information related to a plurality of pulses associated with the at least one node;
updating the communications channel in response to a system event by at least a plurality of updates based on a plurality of intervals between a trigger being communicated through the communications channel, and the plurality of pulses; and
storing, in the shared storage, information related to a group of pulses associated with one other node;
wherein:
the updating the communications channel enables removal of at least a portion of the information from the shared storage;
the at least one node is characterized by a first output pulse rate;
the one other node is characterized by a second output pulse rate, the second output pulse rate being lower than the first output pulse rate; and
the shared storage comprises:
a first memory area configured to store data related to the plurality of pulses associated with the at least one node; and
at least a second memory area configured to store data related to the group of pulses associated with the one other node, the second memory area being smaller than the first memory area.

25. The method of claim 24, wherein:
the at least one node is characterized by a state; and
the system event is configured to maintain the state.

26. The method of claim 24, wherein receiving the system event comprises communicating a second triggering pulse via the communications channel.

27. The method of claim 26, further comprising:
modifying a state of the at least one node based at least in part on the second triggering pulse;
wherein updating the communications channel is executed prior to the modifying the state.

* * * * *